US011469017B2

(12) United States Patent
Yasuda et al.

(10) Patent No.: US 11,469,017 B2
(45) Date of Patent: *Oct. 11, 2022

(54) GRAIN ORIENTED ELECTRICAL STEEL SHEET

(71) Applicant: NIPPON STEEL CORPORATION, Tokyo (JP)

(72) Inventors: Masato Yasuda, Tokyo (JP); Masaru Takahashi, Tokyo (JP); Yoshiyuki Ushigami, Tokyo (JP); Shinya Yano, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 104 days.

This patent is subject to a terminal disclaimer.

(21) Appl. No.: 16/962,798

(22) PCT Filed: Jan. 24, 2019

(86) PCT No.: PCT/JP2019/002258

§ 371 (c)(1),
(2) Date: Jul. 16, 2020

(87) PCT Pub. No.: WO2019/146694

PCT Pub. Date: Aug. 1, 2019

(65) Prior Publication Data

US 2021/0027922 A1 Jan. 28, 2021

(30) Foreign Application Priority Data

Jan. 25, 2018 (JP) ............................ JP2018-010203

(51) Int. Cl.
*B32B 15/00* (2006.01)
*H01F 1/147* (2006.01)
(Continued)

(52) U.S. Cl.
CPC ............ *H01F 1/147* (2013.01); *C21D 6/008* (2013.01); *C21D 8/1222* (2013.01);
(Continued)

(58) Field of Classification Search
None
See application file for complete search history.

(56) References Cited

U.S. PATENT DOCUMENTS 3,905,842 A 9/1975 Grenoble
3,905,843 A 9/1975 Fiedler
(Continued)

FOREIGN PATENT DOCUMENTS

EP 0743370 A2 11/1996
JP 1-230721 A 9/1989
(Continued)

OTHER PUBLICATIONS

Written Opinion of the International Searching Authority for PCT/JP2019/002258 (PCT/ISA/237) dated Apr. 23, 2019.

*Primary Examiner* — Seth Dumbris
*Assistant Examiner* — Kim S. Horger
(74) *Attorney, Agent, or Firm* — Birch, Stewart, Kolasch & Birch, LLP

(57) ABSTRACT

A grain oriented electrical steel sheet includes: a base steel sheet; a lower layer which is arranged in contact with the base steel sheet; and an insulation coating which is arranged in contact with the lower layer and which includes a phosphate and a colloidal silica as main components. The base steel sheet includes the predetermined chemical composition and includes a B compound whose major axis length is 1 to 20 μm and whose number density is $1\times10$ to $1\times10^6$ pieces/$mm^3$. The lower layer is a glass film which includes a forsterite as main component or an intermediate layer includes a silicon oxide as main component.

7 Claims, 1 Drawing Sheet

(51) Int. Cl.

| | |
|---|---|
| ***C21D 6/00*** | (2006.01) |
| ***C21D 8/12*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |

(52) U.S. Cl.
CPC ............ *C21D 8/1255* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 2202/02* (2013.01)

(56) References Cited

U.S. PATENT DOCUMENTS

| | | | |
|---|---|---|---|
| 4,994,120 A | 2/1991 | Takahashi et al. | |
| 5,885,371 A | 3/1999 | Komatsubara et al. | |
| 2012/0103474 A1 | 5/2012 | Ushigami et al. | |
| 2012/0111455 A1 | 5/2012 | Ushigami et al. | |
| 2013/0292006 A1 | 11/2013 | Takahashi et al. | |
| 2018/0002772 A1* | 1/2018 | Han | C22C 38/06 |

FOREIGN PATENT DOCUMENTS

| | | |
|---|---|---|
| JP | 1-283324 A | 11/1989 |
| JP | 10-140243 A | 5/1998 |
| JP | 2010-189752 A | 9/2010 |
| JP | 2012-144777 A | 8/2012 |
| KR | 10-2013-0101575 A | 9/2013 |
| WO | WO 2011/007771 A1 | 1/2011 |
| WO | WO 2011/007817 A1 | 1/2011 |

* cited by examiner

GRAIN ORIENTED ELECTRICAL STEEL SHEET

TECHNICAL FIELD

The present invention relates to a grain oriented electrical steel sheet with high magnetic flux density and extremely low iron loss, which is used as an iron core material for a transformer or a generator.

Priority is claimed on Japanese Patent Application No. 2018-010203, filed on Jan. 25, 2018, and the content of which is incorporated herein by reference.

BACKGROUND ART

A grain oriented electrical steel sheet is a soft magnetic material and is used for an iron core and the like of electric equipment such as a transformer. The grain oriented electrical steel sheet includes approximately 7 mass % or less of Si and has grains which highly aligns in {110}<001> orientation as miller index. When the grain oriented electrical steel sheet is produced, it is important to control the orientation of grains in a process, and the orientation is controlled by an abnormal grain growth phenomenon called secondary recrystallization.

In order to appropriately control the secondary recrystallization, it is important to appropriately form a structure (primary recrystallized structure) by primary recrystallization before secondary recrystallization and to appropriately control grain boundary segregated elements or fine precipitates called inhibitor.

The inhibitor has functions to suppress growth of grains other than grain having {110}<001> orientation in the primary recrystallized structure and to promote preferential growth of grain having {110}<001> orientation during the secondary recrystallization. Thus, in particular, it is important to control type and amount of the inhibitors.

Many researches have been disclosed regarding the inhibitors. Among them, as a characteristic technique, there is a technique of utilizing B as the inhibitor. For example, the patent documents 1 & 2 disclose that solid-soluted B has the function as the inhibitor and is effective in developing the {110}<001>orientation.

The patent documents 3 and 4 disclose that fine BN is made to form by nitriding a material including B in a process after cold rolling, the formed fine BN acts as the inhibitor, and thereby, the {110}<001> orientation is developed.

The patent document 5 discloses that, although BN is made not to precipitate as much as possible during hot rolling, extremely fine BN is made to precipitate during heating stage of the subsequent annealing, and the formed fine BN acts as the inhibitor.

The patent documents 6 and 7 disclose a method in which, by controlling precipitation morphology of B in hot rolling process, the precipitate is made to act as the inhibitor.

These documents disclose the techniques of adding B as a steel composition and of utilizing B as the inhibitor. These documents disclose that, by the techniques, the {110}<001> orientation is significantly developed after the secondary recrystallization, hysteresis loss is reduced, and thus, the grain oriented electrical steel sheet with low iron loss can be obtained. However, these documents do not disclose that, by controlling precipitation morphology of B after the secondary recrystallization, it is possible to achieve both high magnetic flux density and extremely low iron loss.

RELATED ART DOCUMENTS

Patent Documents

[Patent Document 1] U.S. Pat. No. 3,905,842
[Patent Document 2] U.S. Pat. No. 3,905,843
[Patent Document 3] Japanese Unexamined Patent Application, First Publication No. H01-230721
[Patent Document 4] Japanese Unexamined Patent Application, First Publication No. H01-283324
[Patent Document 5] Japanese Unexamined Patent Application, First Publication No. H10-140243
[Patent Document 6] PCT International Publication No. WO2011/007771
[Patent Document 7] PCT International Publication No. WO2011/007817

SUMMARY OF INVENTION

Technical Problem to be Solved

By the conventional techniques disclosed in the related art documents, since it is difficult to sufficiently control the precipitation morphology of B in the steel sheet after the secondary recrystallization, the hysteresis loss increases due to the B precipitates. Thus, it is difficult to obtain the grain oriented electrical steel sheet with extremely low iron loss.

The present invention has been made in consideration of the situations of the conventional techniques. An object of the invention is to provide a grain oriented electrical steel sheet by which it is possible to solve the problems such that high magnetic flux density and extremely low iron loss need to be achieved, in the grain oriented electrical steel sheet utilizing a B compound as an inhibitor.

Solution to Problem

In order to stably produce the grain oriented electrical steel sheet with high magnetic flux density and extremely low iron loss by adding B as the steel composition, it is important to appropriately control the precipitation morphology of B in the steel sheet, in addition to increasing the magnetic flux density by highly aligning the {110}<001> orientation regarding the grains after the secondary recrystallization.

In a case where BN is utilized as the inhibitor and the precipitation morphology of B is fine after the final annealing, the fine BN is precipitated in the steel sheet, and thus, it is difficult to achieve both high magnetic flux density and extremely low iron loss. In particular, the hysteresis loss increases due to the fine BN, and thus, it is difficult to achieve extremely low iron loss.

Based on the above, the present inventors have made a thorough investigation to solve the above mentioned problems. As a result, it is found that, by controlling the precipitation morphology of B after final annealing to be $Fe_2B$ and/or $Fe_3B$, the influence on hysteresis loss can be minimized, and thereby, it is possible to obtain the grain oriented electrical steel sheet in which both high magnetic flux density and extremely low iron loss are achieved.

The present invention is made on the basis of the above-described findings. An aspect of the present invention employs the following.

(1) A grain oriented electrical steel sheet according to an aspect of the present invention includes: a base steel sheet; a lower layer which is arranged in contact with the base steel sheet; and an insulation coating which is arranged in contact with the lower layer and which includes a phosphate and a colloidal silica as main components, wherein the base steel sheet includes: as a chemical composition, by mass %, 0.085% or less of C;

0.80 to 7.00% of Si;

0.05 to 1.00% of Mn;

0.010 to 0.065% of Al;

0.0040% or less of N;

0.015% or less of Seq=S+0.406·Se;

0.0005 to 0.0080% of B; and a balance consisting of Fe and impurities, the base steel sheet includes a B compound whose major axis length is 1 to 20 μm and whose number density is 1×10 to $1\times10^6$ pieces/$mm^3$, and the lower layer is a glass film which includes a forsterite as main component or an intermediate layer includes a silicon oxide as main component.

(2) In the grain oriented electrical steel sheet according to (1), the lower layer may be the glass film, and when a glow discharge emission spectroscopy is conducted after removing the insulation coating and the glass film, when a region which is a glass film side from a thickness center of the base steel sheet is divided into two regions which are a surface region in the glass film side and a center region between the surface region and the thickness center, when a sputtering time to reach the center region is referred to as t (center), when a sputtering time to reach the surface region is referred to as t (surface), when a B emission intensity in the time t (center) is referred to as $I_{B\_t(center)}$, and when a B emission intensity in the time t (surface) is referred to as $I_{B\_t(surface)}$, the $I_{B\_t(center)}$ and the $I_{B\_t(surface)}$ may satisfy a following expression (1).

$$I_{B\_t(center)} > I_{B\_t(surface)} \quad (1)$$

(3) In the grain oriented electrical steel sheet according to (1), the lower layer may be the intermediate layer, and when a total thickness of the base steel sheet and the intermediate layer is referred to as d, when a B emission intensity at a depth of d/2 from a surface of the intermediate layer in a case where a B emission intensity is measured by a glow discharge emission spectroscopy (GDS) from the surface of the intermediate layer is referred to as $I_{B(d/2)}$, and when a B emission intensity at a depth of d/10 from the surface of the intermediate layer is referred to as $I_{B(d/10)}$, the $I_{B(d/2)}$ and the $I_{B(d/10)}$ may satisfy a following expression (2).

$$I_{B(d/2)} > I_{B(d/10)} \quad (2)$$

(4) In the grain oriented electrical steel sheet according to any one of (1) to (3), the B compound may be at least one selected from group consisting of $Fe_2B$ and $Fe_3B$.

Effects of Invention

According to the above aspects of the present invention, in the grain oriented electrical steel sheet utilizing the B compound as the inhibitor, it is possible to industrially and stably provide the grain oriented electrical steel sheet in which the hysteresis loss can be reduced by appropriately controlling the precipitation morphology of B compound, and thereby, both high magnetic flux density and extremely low iron loss are achieved.

DETAILED DESCRIPTION OF PREFERRED EMBODIMENTS

Figure 1:
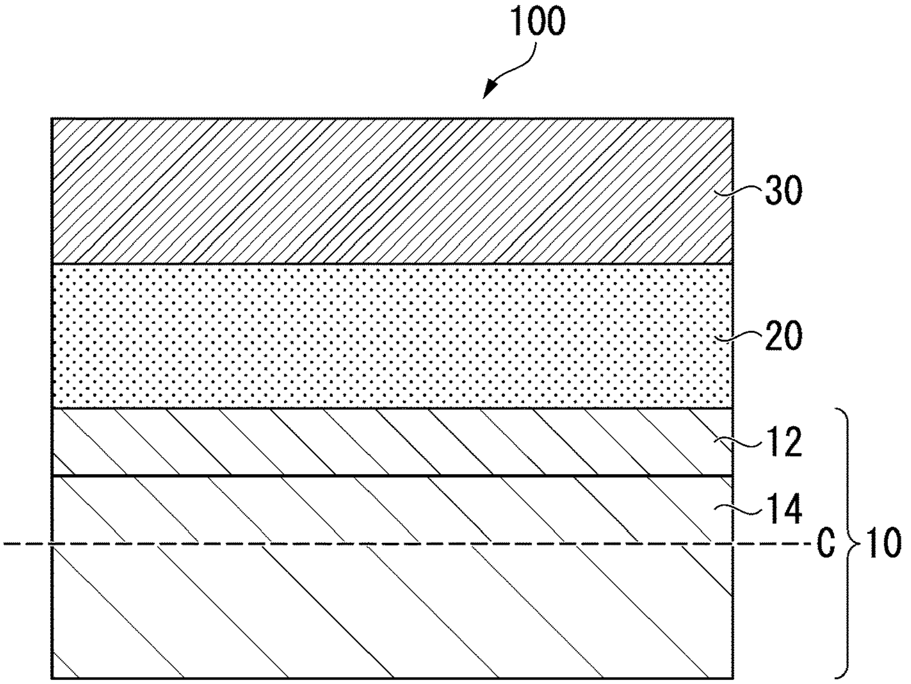
FIG. 1 is a schema illustrating the layering structure of the grain oriented electrical steel sheet according to the first embodiment.

A grain oriented electrical steel sheet according to an embodiment (hereinafter, it may be referred to as "the present electrical steel sheet") includes: a base steel sheet; a lower layer which is formed in contact with the base steel sheet; and an insulation coating which is formed in contact with the lower layer and which includes a phosphate and a colloidal silica as main components, wherein the base steel sheet includes: as a chemical composition, by mass %, 0.085% or less of C;

0.80 to 7.00% of Si;

0.05 to 1.00% of Mn;

0.010 to 0.065% of Al;

0.012% or less of N;

0.015% or less of Seq=S+0.406·Se;

0.0005 to 0.0080% of B; and a balance consisting of Fe and impurities, the base steel sheet includes a B compound whose average major axis length is 1 to 20 μm and whose number density is 1×10 to $1\times10^6$ pieces/$mm^3$, and the lower layer is a glass film which includes a forsterite as main component or an intermediate layer includes a silicon oxide as main component.

In addition, in the present electrical steel sheet, the lower layer may be the glass film, and when a B emission intensity measured by glow discharge emission spectroscopy (GDS) of a steel sheet without the glass film in the grain oriented electrical steel sheet is referred to as $I_B$, when a sputtering time to reach a center is referred to as t (center), when a sputtering time for a steel sheet surface without the glass film is referred to as t (surface), when a B emission intensity in the t (center) is referred to as $I_{B\_t(center)}$, and when a B emission intensity in the t (surface) is referred to as $I_{B\_t(surface)}$, the $I_{B\_t(center)}$ and the $I_{B\_t(surface)}$ may satisfy a following expression (1).

$$I_{B\_t(center)} > I_{B\_t(surface)} \quad (1)$$

In addition, in the present electrical steel sheet, the lower layer may be the intermediate layer, and when a total thickness of the base steel sheet and the intermediate layer is referred to as d, when a B emission intensity at a depth of d/2 from a surface of the intermediate layer in a case where a B emission intensity is measured by a glow discharge emission spectroscopy (GDS) from the surface of the intermediate layer is referred to as $I_{B(d/2)}$, and when a B emission intensity at a depth of d/10 from the surface of the intermediate layer is referred to as $I_{B(d/10)}$, the $I_{B(d/2)}$ and the $I_{B(d/10)}$ may satisfy a following expression (2).

$$I_{B(d/2)} > I_{B(d/10)} \quad (2)$$

In addition, in the present electrical steel sheet, the B compound may be $Fe_2B$ and/or $Fe_3B$.

Hereinafter, the present electrical steel sheet is explained.

First Embodiment

A grain oriented electrical steel sheet according to the first embodiment includes: a base steel sheet; a glass film which is arranged in contact with the base steel sheet and which includes a forsterite as main component; and an insulation coating which is arranged in contact with the glass film and which includes a phosphate and a colloidal silica as main components.

The base steel sheet includes: as a chemical composition, by mass %, 0.085% or less of C;

0.80 to 7.00% of Si;

0.05 to 1.00% of Mn;

0.010 to 0.065% of Al;

0.012% or less of N;

0.015% or less of Seq=S+0.406·Se;

0.0005 to 0.0080% of B; and a balance consisting of Fe and impurities, and the base steel sheet includes a B compound whose major axis length is 1 to 20 μm and whose number density is 1×10 to $1\times10^6$ pieces/$mm^3$.

In addition, in the grain oriented electrical steel sheet according to the present embodiment, when a region which is a glass film side from a thickness center of the base steel sheet is divided into two regions which are a surface region in the glass film side and a center region between the surface region and the thickness center, when a B emission intensity measured by glow discharge emission spectroscopy (GDS) of the base steel sheet without the insulation coating and the glass film is referred to as $I_B$, when a sputtering time to reach the center region is referred to as t (center), when a sputtering time to reach the surface region is referred to as t (surface), when a B emission intensity in the time t (center) is referred to as $I_{B\_t(center)}$, and when a B emission intensity in the time t (surface) is referred to as $I_{B\_t(surface)}$, the $I_{B\_t(center)}$ and the $I_{B\_t(surface)}$ may satisfy a following expression (3).

$$I_{B\_t(center)} > I_{B\_t(surface)} \quad (3)$$

<Chemical Composition of Base Steel Sheet>

Limitation reasons of the chemical composition of the base steel sheet of the present electrical steel sheet are explained. Hereinafter, unless otherwise noted, "%" of the chemical composition represents "mass %".

<Chemical Composition>

0.085% or less of C

C is an element effective in controlling the primary recrystallized structure, but negatively affective in the magnetic characteristics. Thus, C is the element to be removed by decarburization annealing before final annealing. When the C content is more than 0.085%, a time for decarburization annealing needs to be prolonged, and the productivity decreases, which is not preferable. The C content is preferably 0.070% or less, and more preferably 0.050% or less.

Although the lower limit of C includes 0%, the producing cost drastically increases in order to reduce C to be less than 0.0001%. Thus, the lower limit of C is substantially 0.0001% as practical steel sheet.

0.80 to 7.00% of Si

Si is an element which increases the electric resistance of steel sheet and improves the iron loss characteristics. When the Si content is less than 0.80%, γ transformation occurs during the final annealing and the crystal orientation of steel sheet is impaired, which is not preferable. The Si content is preferably 1.50% or more, and more preferably 2.50% or more.

On the other hand, when the Si content is more than 7.00%, the workability deteriorates and the cracks occur during rolling, which is not preferable. The Si content is preferably 5.50% or less, and more preferably 4.50% or less.

0.05 to 1.00% of Mn

Mn is an element to suppress the cracks during hot rolling and to form MnS and/or MnSe which act as the inhibitor by bonding to S and/or Se. When the Mn content is less than 0.05%, the effect of addition is not sufficiently obtained, which is not preferable. The Mn content is preferably 0.07% or more, and more preferably 0.09% or more.

On the other hand, when the Mn content is more than 1.00%, the dispersion state of precipitation of MnS and/or MnSe becomes uneven, the desired secondary recrystallized structure cannot be obtained, and the magnetic flux density decreases, which is not preferable. The Mn content is preferably 0.80% or less, and more preferably 0.60% or less.

0.010 to 0.065% of Acid Soluble Al

The acid soluble Al is an element to form (Al, Si)N which acts as the inhibitor by bonding to N. When the amount of acid soluble Al is less than 0.010%, the effect of addition is not sufficiently obtained, the secondary recrystallization does not proceed sufficiently, which is not preferable. The amount of acid soluble Al is preferably 0.015% or more, and more preferably 0.020% or more.

On the other hand, when the amount of acid soluble Al is more than 0.065%, the dispersion state of precipitation of (Al, Si)N becomes uneven, the desired secondary recrystallized structure cannot be obtained, and the magnetic flux density decreases, which is not preferable. The amount of acid soluble Al is preferably 0.050% or less, and more preferably 0.040% or less.

0.012% or Less of N

Since a risk of iron loss deterioration due to the formation of nitrides may increase, the N content is to be 0.012% or less. As described later, N as the slab composition is an element to form AlN which acts as the inhibitor by bonding to Al. However, N is also an element to form blisters (voids) in the steel sheet during cold rolling. When the N content is less than 0.004%, the formation of AlN becomes insufficient, which is not preferable. The N content is preferably 0.006% or more, and more preferably 0.007% or more.

On the other hand, when the N content is more than 0.012%, the blisters (voids) may be formed in the steel sheet during cold rolling, which is not preferable. The N content is preferably 0.010% or less, and more preferably 0.009% or less.

0.015% or Less of Seq=S+0.406·Se

Since a risk of iron loss deterioration due to the formation of sulfides may increase, the content is to be 0.015% or less. As described later, S and Se as the slab composition are elements to form MnS and/or MnSe which acts as the inhibitor by bonding to Mn. The content thereof is specified by Seq=S+0.406·Se in consideration of the atomic weight ratio of S and Se.

When the Seq is less than 0.003%, the effect of addition is not sufficiently obtained, which is not preferable. The Seq is preferably 0.005% or more, and more preferably 0.007% or more. On the other hand, when the Seq is more than 0.015%, the dispersion state of precipitation of MnS and/or MnSe becomes uneven, the desired secondary recrystallized structure cannot be obtained, and the magnetic flux density decreases, which is not preferable. The Seq is preferably 0.013% or less, and more preferably 0.011% or less.

0.0005 to 0.0080% of B

B is an element to form BN which acts as the inhibitor by bonding to N and by complexly precipitating with MnS or MnSe.

When the B content is less than 0.0005%, the effect of addition is not sufficiently obtained, which is not preferable. The B content is preferably 0.0010% or more, and more preferably 0.0015% or more. On the other hand, when the B content is more than 0.0080%, the dispersion state of precipitation of BN becomes uneven, the desired secondary recrystallized structure cannot be obtained, and the magnetic flux density decreases, which is not preferable. The B content is preferably 0.0060% or less, and more preferably 0.0040% or less.

In the base steel sheet, the balance excluding the above elements is Fe and impurities. The impurities correspond to elements which are unavoidably contaminated from raw materials of the steel and/or production processes. In the present electrical steel sheet, the impurities are acceptable when they are contained within a range that does not deteriorate the characteristics.

In addition, the present electrical steel sheet may include at least one selected from the group consisting of 0.30% or less of Cr, 0.40% or less of Cu, 0.50% or less of P, 1.00% or less of Ni, 0.30% or less of Sn, 0.30% or less of Sb, and 0.01% or less of Bi, which are in the range that can enhance other characteristics without deteriorating the magnetic characteristics.

Next, the characteristic B compound in the present electrical steel sheet is explained.

<Morphology of B Compound>

Although the type of B compound is not limited, the average major axis length as the morphology is to be 1 to 20 μm.

When the major axis length is less than 1 μm, the frequency of precipitation increases and the hysteresis loss increases, which is not preferable. The average major axis length is preferably 4 μm or more, and more preferably 8 μm or more.

On the other hand, it is preferable that the morphology of B compound is coarse in order to reduce the frequency of precipitation. However, it is needed to significantly slow the cooling rate in purification annealing in order to precipitate the B compound with the major axis length of 20 μm or more, which is difficult in industrial production and which is not preferable. Thus, the average major axis length of B compound is to be 20 μm or less. The average major axis length is preferably 17 μm or less, and more preferably 10 μm or less.

<Number Density of B Compound>

The number density of B compound is to be 1×10 to $1\times10^6$ pieces/mm$^3$. When the number density is more than $1\times10^6$ pieces/mm$^3$, the B compound becomes small, the frequency of precipitation of the B compound with the major axis length of less than 1 m increases, and the iron loss increases, which is not preferable. The number density is preferably $0.5\times10^6$ pieces/mm$^3$ or less, and more preferably $1\times10^5$ pieces/mm$^3$ or less.

On the other hand, when the number density of B compound is less than 1×10 pieces/mm$^3$, the B precipitates becomes significantly uneven and does not act as the inhibitor for controlling the secondary recrystallization, which is not preferable. The number density of B compound is preferably 1×10 pieces/mm$^3$ or more, and more preferably $1\times10^2$ pieces/mm$^3$ or more.

For example, the number density of B compound is quantitatively evaluated by conducting B mapping of EPMA on Z plane (plane perpendicular to the rolling direction) of the test piece which is the steel sheet polished to the thickness center. Alternatively, the B mapping of EPMA may be conducted on the polished cross section of the test piece.

<B Compound: $Fe_2B$ or $Fe_3B$>

The B compound is preferably $Fe_2B$ or $Fe_3B$. The B compound is the re-precipitated compound during the cooling of purification annealing, which is originated from BN which has acted as the inhibitor and has soluted during purification annealing.

When N which is solid-soluted in high temperature is not released into the atmosphere and remains supersaturately in the steel sheet, the solid-soluted B bonds to the solid-soluted N during the cooling of purification annealing, BN is re-precipitated finely and quite frequently, and thereby, the hysteresis loss increases. When the annealing temperature is high and the solid-soluted N is released outside the system during purification annealing, $Fe_2B$ or $Fe_3B$ is precipitated coarsely and low-frequently, which reduces the negative influence of iron loss.

Identification of $Fe_2B$ and/or $Fe_3B$ may be conducted by electron beam diffraction using transmission electron microscope in addition to analysis using EPMA. The crystal system of $Fe_2B$ and/or $Fe_3B$ is the tetragonal system, and the features thereof are 562.1 μm>a=b>459.9 μm and 467.4 μm>c>382.4 μm.

<B Distribution Identified by GDS>

In B distribution in the depth direction of the steel sheet, the fact that the B concentration (intensity) in the surface region of base steel sheet is higher than the B concentration (intensity) in the center region of base steel sheet indicates that the fine BN exists in the surface region of base steel sheet. In the above case, the iron loss increases, which is not preferable.

FIG. 1 is a schema illustrating the layering structure of the grain oriented electrical steel sheet according to the present embodiment. As shown in FIG. 1, the grain oriented electrical steel sheet 100 according to the present embodiment includes: the base steel sheet 10; the glass film 20; and the insulation coating 30. Moreover, when a region which is the side of surface (interface between the glass film 20 and the base steel sheet 10) from the thickness center C of the base steel sheet 10 is divided into two regions, the region of surface side is referred to as the surface region 12 and the region of thickness center C side is referred to as the center region 14.

When a B emission intensity measured by glow discharge emission spectroscopy (GDS) of the steel sheet without the insulation coating and the glass film is referred to as $I_B$, when a sputtering time to reach the center region 14 is referred to as t (center), when a sputtering time to reach the surface region 12 is referred to as t (surface), it is preferable that the $I_{B\_t(center)}$ and the $I_{B\_t(surface)}$ satisfy a following expression (4).

$$I_{B\_t(center)} > I_{B\_t(surface)} \quad (4)$$

$I_{B\_t(center)}$: B emission intensity in the t (center)

$I_{B\_t(surface)}$: B emission intensity in the t (surface)

When conducting the above measurement, the insulating coating 30 is removed using an alkaline aqueous solution such as sodium hydroxide, and the glass film 20 is removed using hydrochloric acid, nitric acid, sulfuric acid, and the like.

The above t (surface) indicates the position just below the glass film, and the above t (center) is defined as the position which is from the position just below the glass film to thickness center.

Figure 2:
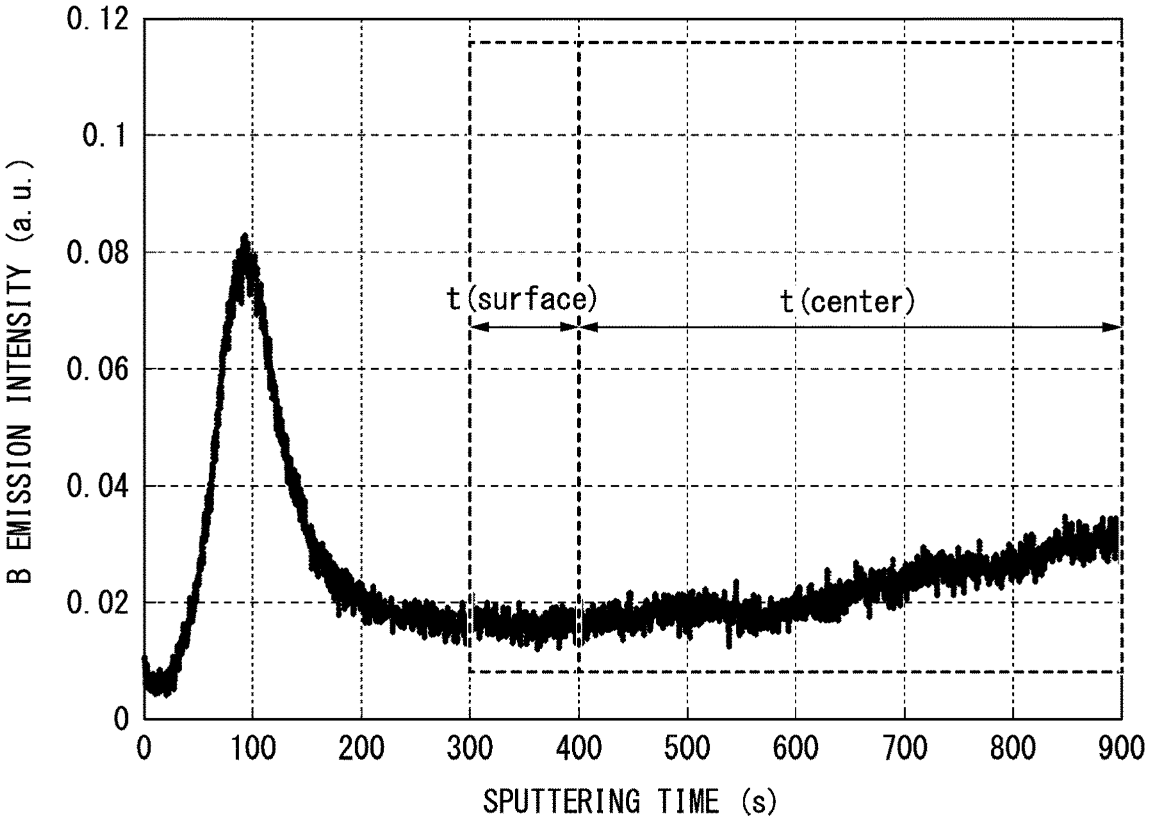
FIG. 2 is a graph, for instance, showing the result of conducting GDS to the grain oriented electrical steel sheet according to the first embodiment.

FIG. 2 is an instance showing the measuring result of GDS in the present embodiment. Specifically, the t (surface) is defined as 300 to 400 seconds with the measurement start as reference, and the t (center) is defined as the time corresponding to a position of 400 seconds or more.

Moreover, the $I_{B\_t(surface)}$ is defined as the average of B emission intensities in 300 to 400 seconds with the measurement start as reference. The $I_{B\_t(center)}$ is defined as the average of B emission intensities in 400 to 900 seconds (to finishing the measurement) with the measurement start as reference. However, the above times of $I_{B\_t(surface)}$ and $I_{B\_t(center)}$ are the instances because the time can be changed arbitrarily depending on the thickness of glass film, the conditions of GDS measurement, and the like.

In a case of $I_{B\_t(center)} \leq I_{B\_t(surface)}$, the B concentration (intensity) in the surface region of base steel sheet becomes equal to or higher than the B concentration (intensity) in the center region of base steel sheet, the fine BN exists in the surface region of base steel sheet, and thereby, the iron loss increases, which is not preferable.

<Glass Film>

In the grain oriented electrical steel sheet according to the present embodiment, the glass film is formed in contact with the base steel sheet. The glass film includes complex oxides such as forsterite ($Mg_2SiO_4$). The glass film is formed during final annealing as described below, in which an oxide layer including silica as a main component reacts with an annealing separator including magnesia as a main component.

<Insulation Coating>

In the grain oriented electrical steel sheet according to the present embodiment, the insulation coating is formed in contact with the glass film and includes phosphate and colloidal silica as main components.

Next, a method of producing the present electrical steel sheet from the present silicon steel will be described.

<Composition of Silicon Steel Slab>

In the present electrical steel sheet, the silicon steel slab includes: as a chemical composition, by mass %, 0.085% or less of C; 0.80 to 7.00% of Si; 0.05 to 1.00% of Mn; 0.010 to 0.065% of acid-soluble Al; 0.004 to 0.012% of N; 0.003 to 0.015% of Seq=S+0.406·Se; and 0.0005 to 0.0080% of B.

0.085% or Less of C

C is an element effective in controlling the primary recrystallized structure, but negatively affective in the magnetic characteristics. Thus, C is the element to be removed by decarburization annealing before final annealing. When the C content is more than 0.085%, a time for decarburization annealing needs to be prolonged, and the productivity decreases. Thus, the C content is to be 0.085% or less. The C content is preferably 0.070% or less, and more preferably 0.050% or less.

Although the lower limit of C includes 0%, the producing cost drastically increases in order to reduce C to be less than 0.0001%. Thus, the lower limit of C is substantially 0.0001% as practical steel sheet. In the grain oriented electrical steel sheet, C is generally reduced to approximately 0.001% or less in decarburization annealing.

0.80 to 7.00% of Si

Si is an element which increases the electric resistance of steel sheet and improves the iron loss characteristics. When the Si content is less than 0.80%, γ transformation occurs during the final annealing and the crystal orientation of steel sheet is impaired. Thus, the Si content is to be 0.80% or more. The Si content is preferably 1.50% or more, and more preferably 2.50% or more.

On the other hand, when the Si content is more than 7.00%, the workability deteriorates and the cracks occur during rolling. Thus, the Si content is to be 7.00% or less. The Si content is preferably 5.50% or less, and more preferably 4.50% or less.

0.05 to 1.00% of Mn

Mn is an element to suppress the cracks during hot rolling and to form MnS which act as the inhibitor by bonding to S and/or Se. When the Mn content is less than 0.05%, the effect of addition is not sufficiently obtained. Thus, the Mn content is to be 0.05% or more. The Mn content is preferably 0.07% or more, and more preferably 0.09% or more.

On the other hand, when the Mn content is more than 1.00%, the dispersion state of precipitation of MnS becomes uneven, the desired secondary recrystallized structure cannot be obtained, and the magnetic flux density decreases. Thus, the Mn content is to be 1.00% or less. The Mn content is preferably 0.80% or less, and more preferably 0.06% or less.

0.010 to 0.065% of Acid Soluble Al

The acid soluble Al is an element to form (Al, Si)N which acts as the inhibitor by bonding to N. When the amount of acid soluble Al is less than 0.010%, the effect of addition is not sufficiently obtained, the secondary recrystallization does not proceed sufficiently. Thus, the amount of acid soluble Al is to be 0.010% or more. The amount of acid soluble Al is preferably 0.015% or more, and more preferably 0.020% or more.

On the other hand, when the amount of acid soluble Al is more than 0.065%, the dispersion state of precipitation of (Al, Si)N becomes uneven, the desired secondary recrystallized structure cannot be obtained, and the magnetic flux density decreases. Thus, the amount of acid soluble Al is to be 0.065% or less. The amount of acid soluble Al is preferably 0.050% or less, and more preferably 0.040% or less.

0.004 to 0.012% of N

N is an element to form AlN which acts as the inhibitor by bonding to Al. However, N is also an element to form blisters (voids) in the steel sheet during cold rolling. When the N content is less than 0.004%, the formation of AlN becomes insufficient. Thus, the N content is to be 0.004% or more. The N content is preferably 0.006% or more, and more preferably 0.007% or more.

On the other hand, when the N content is more than 0.012%, the blisters (voids) may be formed in the steel sheet during cold rolling. Thus, the N content is to be 0.012% or less. The N content is preferably 0.010% or less, and more preferably 0.009% or less.

0.003 to 0.015% of Seq=S+0.406·Se

S and Se as the slab composition are elements to form MnS and/or MnSe which acts as the inhibitor by bonding to Mn. The content thereof is specified by Seq=S+0.406·Se in consideration of the atomic weight ratio of S and Se.

When the Seq is less than 0.003%, the effect of addition is not sufficiently obtained. Thus, the Seq is to be 0.003% or more. The Seq is preferably 0.005% or more, and more preferably 0.007% or more. On the other hand, when the Seq is more than 0.015%, the dispersion state of precipitation of MnS and/or MnSe becomes uneven, the desired secondary recrystallized structure cannot be obtained, and the magnetic flux density decreases. Thus, the Seq is to be 0.015% or less. The Seq is preferably 0.013% or less, and more preferably 0.011% or less.

0.0005 to 0.0080% of B

B is an element to form BN which acts as the inhibitor by bonding to N and by complexly precipitating with MnS.

When the B content is less than 0.0005%, the effect of addition is not sufficiently obtained. Thus, the B content is to be 0.0005% or more. The B content is preferably 0.0010% or more, and more preferably 0.0015% or more. On the other hand, when the B content is more than 0.0080%, the dispersion state of precipitation of BN becomes uneven, the desired secondary recrystallized structure cannot be obtained, and the magnetic flux density decreases. Thus, the B content is to be 0.0080% or less. The B content is preferably 0.0060% or less, and more preferably 0.0040% or less.

In the silicon steel slab, the balance excluding the above elements is Fe and unavoidable impurities. The impurities correspond to elements which are unavoidably contaminated from raw materials of the steel and/or production processes. In the present electrical steel sheet, the unavoidable impurities are acceptable when they are contained within a range that does not deteriorate the characteristics.

In addition, the present electrical steel sheet may include at least one selected from the group consisting of 0.30% or less of Cr, 0.40% or less of Cu, 0.50% or less of P, 1.00% or less of Ni, 0.30% or less of Sn, 0.30% or less of Sb, and 0.01% or less of Bi, which are in the range that can enhance other characteristics without deteriorating the magnetic characteristics of the silicon steel slab.

<Silicon Steel Slab>

The present slab (silicon steel slab) is obtained by continuously casting or by ingot-making and blooming the molten steel with predetermined chemical composition which is made by a converter or an electric furnace and which is subjected to a vacuum degassing treatment as necessary. The silicon steel slab is generally the steel piece whose thickness is 150 to 350 mm and preferably 220 to 280 mm. The silicon steel slab may be the thin slab whose thickness is 30 to 70 mm. In a case of the thin slab, there is an advantage that it is not necessary to conduct the rough processing for controlling the thickness to be an intermediate thickness in order to obtain the hot rolled sheet.

<Heating Temperature of Silicon Steel Slab>

The steel slab is heated to 1250° C. or less and is subjected to hot rolling. When the heating temperature is more than 1250° C., an amount of melt scale increases, MnS and/or MnSe are completely solid-soluted and are precipitated finely in the subsequent processes, the temperature for decarburization annealing needs to be raised to 900° C. or more in order to obtain the desired grain size after primary recrystallization, which is not preferable. The heating temperature is preferably 1200° C. or less.

The lower limit of heating temperature is not particularly limited. In order to secure the workability of silicon steel slab, the heating temperature is preferably 1100° C. or more.

<Hot Rolling, Hot Band Annealing>

The silicon steel slab heated to 1250° C. or less is subjected to hot rolling in order to obtain the hot rolled steel sheet. The hot rolled steel sheet is heated and recrystallized in 1000 to 1150° C. (first stage temperature), and thereafter, is heated and annealed in 850 to 1100° C. (second stage temperature) which is lower than the first stage temperature, in order to homogenize the nonuniform structure after hot rolling. The hot band annealing is preferably conducted once or more in order to homogenize the hot rolled structure before the hot rolled sheet is subjected to final cold rolling.

In the hot band annealing, the first stage temperature significantly influences the precipitate of inhibitor in the subsequent processes. When the first stage temperature is more than 1150° C., the inhibitor is precipitated finely in the subsequent processes, the temperature for decarburization annealing needs to be raised to 900° C. or more in order to obtain the desired grain size after primary recrystallization, which is not preferable. The first stage temperature is preferably 1120° C.

On the other hand, when the first stage temperature is less than 1000° C., the recrystallization becomes insufficient, the hot rolled structure is not homogenized, which is not preferable. The first stage temperature is preferably 1030° C. or more.

As with the first stage temperature, when the second stage temperature is more than 1100° C., the inhibitor is precipitated finely in the subsequent processes, which is not preferable. The second stage temperature is preferably 1070° C. or less. On the other hand, when the second stage temperature is less than 850° C., γ phase is not transformed, the hot rolled structure is not homogenized, which is not preferable. The second stage temperature is preferably 880° C. or more.

<Cold Rolling>

The steel sheet after hot band annealing is cold-rolled once or cold-rolled two times or more times with an intermediate annealing, in order to obtain the steel sheet with final thickness. The cold rolling may be conducted at the room temperature or the temperature higher than the room temperature. For example, the warm rolling may be conducted after the steel sheet is heated to approximately 200° C.

<Decarburization Annealing>

The steel sheet with final thickness is subjected to decarburization annealing in moist atmosphere, in order to remove C in the steel sheet and to control the primary recrystallized grain to be the desired grain size. For example, it is preferable that the decarburization annealing is conducted in the temperature of 770 to 950° C. for the time such that the grain size after primary recrystallization becomes 15 μm or more.

When the temperature for decarburization annealing is less than 770° C., the desired grain size is not obtained. Thus, the temperature for decarburization annealing is preferably 770° C. or more, and more preferably 800° C. or more. On the other hand, when the temperature for decarburization annealing is more than 950° C., the grain size exceeds the desired grain size, which is not preferable. The temperature for decarburization annealing is preferably 920° C. or less.

<Nitridation>

The steel sheet after decarburization annealing is subjected to nitridation before final annealing, so as to control the N content of steel sheet to be 40 to 1000 ppm. When the N content of steel sheet after nitridation is less than 40 ppm, AlN is not precipitated sufficiently, and does not act as the inhibitor, which is not preferable. The N content of steel sheet after nitridation is preferably 80 ppm or more.

On the other hand, when the N content of steel sheet is more than 1000 ppm, AlN remains excessively after finishing the secondary recrystallization in the following final annealing, the iron loss increases, which is not preferable. The N content of steel sheet is preferably 970 ppm or less.

<Annealing Separator Applying>

The steel sheet after nitridation is applied annealing separator to, and is subjected to final annealing. As the annealing separator, it is possible to use the general annealing separator.

<Final Annealing>

<Secondary Recrystallization Annealing>

In the secondary recrystallization annealing of final annealing, since the inhibitor is enhanced by BN, the heating rate in the temperature range of 1000 to 1100° C. is preferably 15° C./hour or less, and more preferably 10° C./hour or less. Instead of controlling the heating rate, the steel sheet may be held in the temperature range of 1000 to 1100° C. for 10 hours or more.

<Purification Annealing>

The steel sheet after secondary recrystallization annealing is subjected to purification annealing which is followed the secondary recrystallization annealing. By conducting the purification annealing for the steel sheet after finishing secondary recrystallization, the precipitates which have been utilized as the inhibitor is made harmless, and the hysteresis loss decreases as the magnetic characteristics of final product, which is preferable. The atmosphere of purification annealing is not particularly limited, but may be the hydrogen atmosphere for example. Moreover, the purification annealing is conducted in the temperature of approximately 1200° C. for 10 to 30 hours. The temperature of purification annealing is not particularly limited, but is preferably 1180 to 1220° C. from the productivity standpoint. When the temperature of purification annealing is 1180° C. or less, it takes excessively the time for diffusing the elements, the annealing time needs to be prolonged, which is not preferable. On the other hand, when the temperature of purification annealing is 1220° C. or more, maintenance (durability) of annealing furnace becomes difficult, which is not preferable.

<Cooling Condition>

The steel sheet after purification annealing is cooled under the predetermined cooling conditions (cooling rate).

In order to control the major axis length of B compound to be the desired range, the cooling rate in the temperature range of 1200 to 1000° C. is to be less than 50° C./hour. In addition, the cooling rate in the temperature range of 1000 to 600° C. is to be less than 30° C./hour.

The reason for controlling the cooling rate as described above is as follows.

BN is dissolved into the solid soluted B and solid soluted N in the high temperature region, and N which is not solid-soluted is released into the atmosphere during cooling. On the other hand, B which is not solid-soluted is not released outside the system during cooling, and is precipitated as the B compound such as BN, $Fe_2B$, or $Fe_3B$ inside the glass film or the base steel sheet. In a case where the solid soluted B does not exist sufficiently in the base steel sheet, BN does not precipitate, but $Fe_2B$ or $Fe_3B$ precipitates.

When the cooling rate is appropriate during cooling from the high temperature region, the solid soluted N is released outside the system, and $Fe_2B$ or $Fe_3B$ precipitates in the base steel sheet. Moreover, the precipitated $Fe_2B$ or $Fe_3B$ is ostwald-ripened and coarsened.

When the cooling rate is fast, the solid soluted N is not released into the atmosphere, BN is finely precipitated in the base steel sheet, and $Fe_2B$ or $Fe_3B$ is not ostwald-ripened and is finely precipitated. The B compound which is finely precipitated in the base steel sheet results in the increase in the hysteresis loss and in the iron loss of final product.

When the cooling rate is less than 10° C./hour, the productivity is significantly affected. Thus, the cooling rate is preferably 10° C./hour or more. In other words, the cooling rate in the temperature range of 1200 to 1000° C. is preferably 10 to 50° C./hour, and the cooling rate in the temperature range of 1000 to 600° C. is preferably 10 to 30° C./hour.

The atmosphere during cooling is preferably 100% of $H_2$ in the temperature range of at least 1200 to 600° C., and 100% of $N_2$ in the temperature range of less than 600° C. When the atmosphere during cooling is 100% of $N_2$ in the temperature range of 1200 to 600° C., the steel sheet is nitrided during cooling, and the formation of nitrides causes the deterioration of hysteresis loss, which is not preferable. Ar may be substituted for $H_2$ during cooling in the temperature range of 1200 to 600° C., which is not preferable from an economic standpoint.

<Magnetic Domain Refining Treatment>

The grain oriented electrical steel sheet after final annealing may be subjected to magnetic domain refining treatment. By the magnetic domain refining treatment, the grooves are made, the width of magnetic domain decreases, and as a result, the iron loss decreases, which is preferable. The specific method of magnetic domain refining treatment is not particularly limited, but may be the groove making such as laser irradiation, electron beam irradiation, etching, and toothed gear.

Although it is preferable that the magnetic domain refining treatment is conducted after final annealing, the magnetic domain refining treatment may be conducted before final annealing or after forming the insulation coating.

<Insulation Coating Forming>

The insulation coating is formed by applying and baking the solution for forming the insulation coating to the surface of steel sheet after secondary recrystallization or after purification annealing. The type of insulation coating is not particularly limited, but may be the conventionally known insulating coating. For example, the insulation coating may be formed by applying the aqueous solution including phosphate and colloidal silica.

The above phosphate is preferably the phosphate of Ca, Al, Sr, and the like, for example. Among these, aluminum phosphate is more preferable. The type of colloidal silica is not particularly limited, and the particle size thereof (mean number diameter) may be appropriately selected. However, when the particle size thereof is more than 200 nm, the particles may settle in the solution. Thus, the particle size (mean number diameter) of colloidal silica is preferably 200 nm or less, and more preferably 170 nm.

When the particle size of colloidal silica is less than 100 nm, although the dispersion is not affected, the production cost increases. Thus, the particle size of colloidal silica is preferably 100 nm or more, more preferably 150 nm or more from an economic standpoint.

The insulating film is formed by the following. For example, the solution for forming the insulation coating is applied to the surface of steel sheet by the wet applying method such as roll coater, and is baked in 800 to 900° C. for 10 to 60 seconds in air atmosphere.

Second Embodiment

Next, a grain oriented electrical steel sheet according to the second embodiment and the producing method thereof are explained. The explanation of the same features as those of the grain oriented electrical steel sheet according to the first embodiment is omitted in detail.

The grain oriented electrical steel sheet according to the second embodiment includes: a base steel sheet; an intermediate layer which is arranged in contact with the base steel sheet and which includes a silicon oxide as main component; and an insulation coating which is arranged in contact with the intermediate layer and which includes a phosphate and a colloidal silica as main components, wherein the base steel sheet includes: as a chemical composition, by mass %, 0.085% or less of C;

0.80 to 7.00% of Si;

0.05 to 1.00% of Mn;

0.010 to 0.065% of Al;

0.012% or less of N;

0.015% or less of Seq=S+0.406·Se;

0.0005 to 0.0080% of B; and a balance consisting of Fe and impurities, and the base steel sheet includes a B compound whose major axis length is 1 to 20 μm and whose number density is 1×10 to $1\times10^6$ pieces/$mm^3$.

In the grain oriented electrical steel sheet according to the present embodiment, when a total thickness of the base steel sheet and the intermediate layer is referred to as d, when a B emission intensity at a depth of d/2 from a surface of the intermediate layer in a case where a B emission intensity is measured by a glow discharge emission spectroscopy (GDS) from the surface of the intermediate layer is referred to as $I_{B(d/2)}$, and when a B emission intensity at a depth of d/10 from the surface of the intermediate layer is referred to as $I_{B(d/10)}$, the $I_{B(d/2)}$ and the $I_{B(d/10)}$ may satisfy a following expression (5).

$$I_{B(d/2)}>I_{B(d/10)} \quad (5)$$

Although the grain oriented electrical steel sheet according to the first embodiment includes the glass film between the base steel sheet and the insulation coating, the grain oriented electrical steel sheet according to the second embodiment includes the intermediate layer between the base steel sheet and the insulation coating.

<Intermediate Layer>

The grain oriented electrical steel sheet according to the present embodiment includes the intermediate layer which is formed in contact with the base steel sheet and which includes the silicon oxide as main component.

The silicon oxide which is the main component of intermediate layer is preferably $SiO\alpha$ ($\alpha$=1.0 to 2.0). When $\alpha$=1.5 to 2.0, the silicon oxide becomes more stable, which is preferable. It is possible to form $SiO_2$ with $\alpha\approx2.0$ by sufficiently conducting the oxidation annealing for forming silicon oxide on the surface of the steel sheet.

<B Distribution Identified by GDS>

In B distribution in the depth direction of the steel sheet, the fact that the B concentration (intensity) in the surface region of base steel sheet is higher than the B concentration (intensity) in the center region of base steel sheet indicates that the fine BN exists in the surface region of base steel sheet. In the above case, the iron loss increases, which is not preferable.

Thus, when a total thickness of the base steel sheet and the intermediate layer is referred to as d, when a B emission intensity at a depth of d/2 from a surface of the intermediate layer in a case where a B emission intensity is measured by a glow discharge emission spectroscopy (GDS) from the surface of the intermediate layer is referred to as $I_{B(d/2)}$, and a B emission intensity at a depth of d/10 from the surface of the intermediate layer is referred to as $I_{B(d/10)}$, it is preferable that the $I_{B(d/2)}$ and the $I_{B(d/10)}$ satisfy a following expression (6).

$$I_{B(d/2)}>I_{B(d/10)} \quad (6)$$

The total thickness d of the base steel sheet and the intermediate layer is measured as follows. For the grain oriented electrical steel sheet which is produced by the producing method described below, the insulating coating is removed using an alkaline aqueous solution such as sodium hydroxide. By removing as described above, the steel sheet becomes the state in which only the intermediate layer is arranged on the base steel sheet, and then, the total thickness d of the base steel sheet and the intermediate layer is measured with a micrometer or a thickness gauge.

<Producing Method>

In the method for producing the grain oriented electrical steel sheet according to the first embodiment, the annealing separator which includes magnesia as the main component is applied to the steel sheet after nitridation, the final annealing is conducted, and thereby, the glass film which includes forsterite is formed on the surface of base steel sheet. On the other hand, in the method for producing the grain oriented electrical steel sheet according to the second embodiment, the glass film which is formed by the above method is removed by pickling, grinding, and the like. After the above removal, it is preferable that the surface of steel sheet is smoothened by chemical polishing or electrochemical polishing.

Alternatively, instead of magnesia, it is possible to use the annealing separator which includes alumina as the main component. The above annealing separator may be applied and dried, the steel sheet may be coiled after drying, and the final annealing (secondary recrystallization) may be conducted. By the above final annealing, it is possible to produce the grain oriented electrical steel sheet in which the formation of the inorganic film such as forsterite is suppressed. After the above production, it is preferable that the surface of steel sheet is smoothened by chemical polishing or electrochemical polishing.

<Intermediate Layer Forming Annealing>

In the method for producing the grain oriented electrical steel sheet according to the second embodiment, the final annealing is conducted by the above-mentioned method, and thereafter, the intermediate layer forming annealing is conducted.

The annealing is conducted for the grain oriented electrical steel sheet in which the inorganic film such as forsterite is removed or the grain oriented electrical steel sheet in which the formation of the inorganic film such as forsterite is suppressed, and thereby, the intermediate layer which includes the silicon oxide as main component is formed on the surface of base steel sheet.

The annealing atmosphere is preferably a reducing atmosphere so that the inside of the steel sheet is not oxidized. In particular, a nitrogen atmosphere mixed with hydrogen is preferable. For example, an atmosphere in which hydrogen: nitrogen is 75%: 25% and a dew point is −20 to 0° C. is preferable.

Except for the production conditions described above, the method for producing the grain oriented electrical steel sheet according to the second embodiment is the same as the method for producing the grain oriented electrical steel sheet according to the first embodiment. Also, the magnetic domain refining treatment is the same as that in the first embodiment. The magnetic domain refining treatment may be conducted before final annealing, after final annealing, or after forming the insulation coating.

EXAMPLES

Hereinafter, the examples of the present invention is explained. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

The steel slab whose chemical composition was shown in Table 1-1 was heated to 1150° C. The steel slab was hot-rolled to obtain the hot rolled steel sheet whose thickness was 2.6 mm. The hot rolled steel sheet was subjected to the hot band annealing in which the hot rolled steel sheet was annealed at 1100° C. and then annealed at 900° C. The steel sheet after hot band annealing was cold-rolled once or cold-rolled plural times with the intermediate annealing to obtain the cold rolled steel sheet whose thickness was 0.22 mm.

TABLE 1-1

| | SLAB | CHEMICAL COMPOSITION (mass %) | | | | | | | | |
|---|---|---|---|---|---|---|---|---|---|---|
| | No. | C | Si | Mn | Al | N | S | Se | Seq | B |
| INVENTIVE EXAMPLE | A1 | 0.08 | 3.45 | 0.1 | 0.0275 | 0.0082 | 0.0065 | 0 | 0.0065 | 0.0015 |
| | A2 | 0.07 | 1.89 | 0.1 | 0.0285 | 0.0091 | 0.0062 | 0 | 0.0062 | 0.002 |
| | A3 | 0.04 | 6.52 | 0.1 | 0.0290 | 0.0086 | 0.0055 | 0.001 | 0.0065 | 0.0018 |
| | A4 | 0.07 | 3.45 | 0.08 | 0.0277 | 0.0081 | 0.0062 | 0.001 | 0.0072 | 0.0019 |
| | A5 | 0.05 | 3.33 | 0.8 | 0.0288 | 0.0079 | 0.0065 | 0 | 0.0065 | 0.0021 |
| | A6 | 0.06 | 4.52 | 0.12 | 0.02 | 0.0077 | 0.0071 | 0 | 0.0071 | 0.0016 |
| | A7 | 0.08 | 3.12 | 0.09 | 0.055 | 0.0083 | 0.0068 | 0 | 0.0068 | 0.0017 |
| | A8 | 0.05 | 2.81 | 0.09 | 0.0299 | 0.0052 | 0.0069 | 0 | 0.0069 | 0.0018 |
| | A9 | 0.07 | 3.12 | 0.11 | 0.0295 | 0.011 | 0.0072 | 0 | 0.0072 | 0.0019 |
| | A10 | 0.05 | 2.92 | 0.13 | 0.0299 | 0.0088 | 0.0031 | 0.002 | 0.0051 | 0.0021 |
| | A11 | 0.05 | 3.45 | 0.12 | 0.0275 | 0.0089 | 0.0061 | 0.008 | 0.0141 | 0.0022 |
| | A12 | 0.06 | 3.44 | 0.1 | 0.0266 | 0.0091 | 0.0065 | 0 | 0.0065 | 0.0006 |
| | A13 | 0.07 | 4.21 | 0.1 | 0.0271 | 0.0092 | 0.0072 | 0 | 0.0072 | 0.0078 |
| | A14 | 0.06 | 3.45 | 0.1 | 0.031 | 0.0091 | 0.0072 | 0 | 0.0072 | 0.0025 |
| | A15 | 0.06 | 3.35 | 0.1 | 0.0299 | 0.0092 | 0.0056 | 0 | 0.0056 | 0.0017 |
| COMPARATIVE EXAMPLE | a1 | 0.15 | 3.45 | 0.12 | 0.0285 | 0.0082 | 0.0065 | 0 | 0.0065 | 0.0002 |
| | a2 | 0.06 | 0.5 | 0.08 | 0.0275 | 0.0091 | 0.0067 | 0 | 0.0067 | 0.0004 |
| | a3 | 0.05 | 8 | 0.09 | 0.0277 | 0.0099 | 0.0068 | 0 | 0.0068 | 0.0004 |
| | a4 | 0.04 | 3.45 | 0.04 | 0.0291 | 0.0068 | 0.0088 | 0.001 | 0.0098 | 0.0002 |
| | a5 | 0.07 | 3.35 | 1.21 | 0.0288 | 0.0088 | 0.0091 | 0.002 | 0.0111 | 0.0006 |
| | a6 | 0.05 | 3.25 | 0.08 | 0.005 | 0.0071 | 0.0062 | 0.003 | 0.0092 | 0.0007 |
| | a7 | 0.06 | 3.12 | 0.07 | 0.082 | 0.0089 | 0.0059 | 0 | 0.0059 | 0.0009 |
| | a8 | 0.05 | 3.45 | 0.1 | 0.0265 | 0.0152 | 0.0091 | 0.001 | 0.0101 | 0.0003 |
| | a9 | 0.05 | 3.15 | 0.08 | 0.0258 | 0.0082 | 0.01 | 0.01 | 0.02 | 0.0002 |
| | a10 | 0.06 | 3.28 | 0.1 | 0.0266 | 0.0089 | 0.0065 | 0.0001 | 0.0066 | 0.0003 |
| | a11 | 0.05 | 3.19 | 0.13 | 0.0277 | 0.0085 | 0.0067 | 0 | 0.0067 | 0.0152 |

The cold rolled steel sheet with final thickness of 0.22 mm was subjected to the decarburization annealing in which the soaking was conducted at 860° C. in moist atmosphere. The nitridation (annealing to increase the nitrogen content of steel sheet) was conducted for the steel sheet after decarburization annealing. The annealing separator which included magnesia as the main component was applied to the steel sheet after nitridation, and then the steel sheet was held at 1200° C. for 20 hours in hydrogen gas atmosphere. The steel sheet after being held was cooled by 40° C./hour in the temperature range of 1200 to 1000° C. and by 20° C./hour in the temperature range of 1000 to 600° C. At the time, the atmosphere during cooling was 100% of $H_2$ in the temperature range of 1200 to 600° C. and 100% of $N_2$ in the temperature range of less than 600° C.

The excess magnesia was removed from the steel sheet after being annealed, and then, the insulation coating which included phosphate and colloidal silica as main components was formed on the forsterite film (glass film) to obtain the final product.

The chemical composition of the base steel sheet in the product is shown in Table 1-2.

TABLE 1-2

| | STEEL | SLAB | CHEMICAL COMPOSITION (mass %) | | | | | | | | |
|---|---|---|---|---|---|---|---|---|---|---|---|
| | No. | No. | C | Si | Mn | Al | N | S | Se | Seq | B |
| INVENTIVE EXAMPLE | B1 | A1 | 0.002 | 3.45 | 0.1 | 0.0275 | 0.0082 | 0.0065 | 0 | 0.0065 | 0.0015 |
| | B2 | A2 | 0.001 | 1.89 | 0.1 | 0.0285 | 0.0091 | 0.0062 | 0 | 0.0062 | 0.002 |
| | B3 | A3 | 0.003 | 6.52 | 0.1 | 0.0290 | 0.0086 | 0.0055 | 0.001 | 0.0065 | 0.0018 |
| | B4 | A4 | 0.002 | 3.45 | 0.08 | 0.0277 | 0.0081 | 0.0062 | 0.001 | 0.0072 | 0.0019 |
| | B5 | A5 | 0.001 | 3.33 | 0.8 | 0.0288 | 0.0079 | 0.0065 | 0 | 0.0065 | 0.0021 |
| | B6 | A6 | 0.002 | 4.52 | 0.12 | 0.02 | 0.0077 | 0.0071 | 0 | 0.0071 | 0.0016 |
| | B7 | A7 | 0.002 | 3.12 | 0.09 | 0.055 | 0.0083 | 0.0068 | 0 | 0.0068 | 0.0017 |
| | B8 | A8 | 0.001 | 2.81 | 0.09 | 0.0299 | 0.0052 | 0.0069 | 0 | 0.0069 | 0.0018 |
| | B9 | A9 | 0.002 | 3.12 | 0.11 | 0.0295 | 0.011 | 0.0072 | 0 | 0.0072 | 0.0019 |
| | B10 | A10 | 0.001 | 2.92 | 0.13 | 0.0299 | 0.0088 | 0.0031 | 0.002 | 0.0051 | 0.0021 |
| | B11 | A11 | 0.003 | 3.45 | 0.12 | 0.0275 | 0.0089 | 0.0061 | 0.008 | 0.0141 | 0.0022 |

TABLE 1-2-continued

| | STEEL No. | SLAB No. | C | Si | Mn | Al | N | S | Se | Seq | B |
|---|---|---|---|---|---|---|---|---|---|---|---|
| | | | CHEMICAL COMPOSITION (mass %) | | | | | | | | |
| | B12 | A12 | 0.004 | 3.44 | 0.1 | 0.0266 | 0.0091 | 0.0065 | 0 | 0.0065 | 0.0006 |
| | B13 | A13 | 0.002 | 4.21 | 0.1 | 0.0271 | 0.0092 | 0.0072 | 0 | 0.0072 | 0.0078 |
| | B14 | A14 | 0.002 | 3.45 | 0.1 | 0.031 | 0.0091 | 0.0072 | 0 | 0.0072 | 0.0025 |
| | B15 | A15 | 0.002 | 3.35 | 0.1 | 0.0299 | 0.0092 | 0.0056 | 0 | 0.0056 | 0.0017 |
| COMPARATIVE EXAMPLE | b1 | a1 | 0.002 | 3.45 | 0.12 | 0.0285 | 0.0082 | 0.0065 | 0 | 0.0065 | 0.0002 |
| | b2 | a2 | 0.001 | 0.5 | 0.08 | 0.0275 | 0.0091 | 0.0067 | 0 | 0.0067 | 0.0004 |
| | b3 | a3 | 0.003 | 8 | 0.09 | 0.0277 | 0.0099 | 0.0068 | 0 | 0.0068 | 0.0004 |
| | b4 | a4 | 0.002 | 3.45 | 0.04 | 0.0291 | 0.0068 | 0.0088 | 0.001 | 0.0098 | 0.0002 |
| | b5 | a5 | 0.003 | 3.35 | 1.21 | 0.0288 | 0.0088 | 0.0091 | 0.002 | 0.0111 | 0.0006 |
| | b6 | a6 | 0.002 | 3.25 | 0.08 | 0.005 | 0.0071 | 0.0062 | 0.003 | 0.0092 | 0.0007 |
| | b7 | a7 | 0.003 | 3.12 | 0.07 | 0.082 | 0.0089 | 0.0059 | 0 | 0.0059 | 0.0009 |
| | b8 | a8 | 0.005 | 3.45 | 0.1 | 0.0265 | 0.0152 | 0.0091 | 0.001 | 0.0101 | 0.0003 |
| | b9 | a9 | 0.003 | 3.15 | 0.08 | 0.0258 | 0.0082 | 0.01 | 0.01 | 0.02 | 0.0002 |
| | b10 | a10 | 0.002 | 3.28 | 0.1 | 0.0266 | 0.0089 | 0.0065 | 0.0001 | 0.0066 | 0.0003 |
| | b11 | a11 | 0.001 | 3.19 | 0.13 | 0.0277 | 0.0085 | 0.0067 | 0 | 0.0067 | 0.0152 |

<Magnetic Domain Controlling>

For controlling the magnetic domain, mechanical treatment, laser irradiation, electron beam irradiation, and the like were conducted. Some steel sheets were subjected to the magnetic domain controlling in which the groove was made by etching and laser irradiation.

<Type of B Compound>

A flat test piece was taken by FIB from a region including the B compound observed in C section of steel sheet, and then, the precipitate was identified on the basis of electron beam diffraction pattern of transmission electron microscope. As a result, it was identified from JCPDS cards that the precipitate was $Fe_2B$ or $Fe_3B$.

<Number Density of B Compound>

The number density of B compound was determined by analyzing the B concentration mapping with EPMA at 1 μm step size in a region of 2 mm in the rolling direction×2 mm in the width direction on a plane parallel to the rolling direction of the steel sheet.

The number density of B compound was determined by the B concentration mapping with EPMA on the plane parallel to the rolling direction of the steel sheet. For example, the number density was determined by analyzing the region of 2 mm in the rolling direction×2 mm in the width direction at 1 μm step size.

<Major Axis Length of B Compound>

The B compound identified by the above mapping was directly observed by SEM at a magnification of 1000 fold to 5000 fold for example, and then, the average major axis length was determined from major axis lengths of B compounds of 20 pieces or more.

<GDS($I_{B\_t(Center)}/I_{B\_t(Surface)}$)>

Before conducting the GDS measurement, the insulating coating was removed using the alkaline aqueous solution such as sodium hydroxide, and the glass film was removed using hydrochloric acid, nitric acid, sulfuric acid, and the like. The steel sheet after the above removal was subjected to the glow discharge emission spectroscopy (GDS). When a measured B emission intensity was referred to as $I_B$, when a sputtering time to reach the center region was referred to as t (center), when a sputtering time to reach the surface region was referred to as t (surface), when a B emission intensity in the time t (center) was referred to as $I_{B\_t(center)}$, and when a B emission intensity in the time t (surface) was referred to as $I_{B\_t(surface)}$, the $I_{B\_t(center)}$ and the $I_{B\_t(surface)}$ were measured, and then the ratio $I_{B\_t(center)}/I_{B\_t(surface)}$ was calculated. At the time, the t (surface) was 300 to 400 seconds, and the t (center) was 400 to 900 seconds.

<Magnetic Characteristics>

<Magnetic Flux Density $B_8$>

As to the grain oriented electrical steel sheet obtained by the above producing method, the magnetic flux density Bs (magnetic flux density magnetized in 800 A/m) was measured by the single sheet tester (SST) method.

<Iron Loss $W_{17/50}$>

The test pieces (for example, test piece of 100 mm×500 mm) were taken from the grain oriented electrical steel sheets before controlling the magnetic domain and after controlling the magnetic domain, and then, the iron loss $W_{17/50}$ (unit: W/kg) which was the energy loss per unit weight was measured under excitation conditions such as a magnetic flux density of 1.7 T and a frequency of 50 Hz.

The structural features and characteristics of the inventive examples and comparative examples are shown in Table 2. In the inventive examples C1 to C15 which satisfied the inventive conditions, the grain oriented electrical steel sheets with excellent magnetic characteristics were obtained as compared with the comparative examples.

TABLE 2

| | | | B COMPOUND | | | | | | MAGNETIC CHARACTERISTICS | | | | |
|---|---|---|---|---|---|---|---|---|---|---|---|---|---|
| | | | | | | | | | | | IRON LOSS AFTER CONTROLLING | | |
| | No. | STEEL No. | NUMBER DENSITY (pieces/$mm^3$) | MAJOR AXIS LENGTH (μm) | $Fe_2B$ | $Fe_3B$ | GDS $I_{B\_t\ (center)}/I_{B\_t\ (surface)}$ | LOWER LAYER | MAGNETIC FLUX DENSITY $B_8$ (T) | IRON LOSS $W_{17/50}$ (W/kg) | MAGNETIC DOMAIN $W_{17/50}$ (W/kg) | METHOD FOR CONTROLLING MAGNETIC DOMAIN | NOTE |
| INVENTIVE EXAMPLE | C1 | B1 | $2 \times 10^5$ | 3 | EXIST-ENCE | EXIST-ENCE | 15 | GLASS FILM | 1.923 | 0.82 | 0.67 | LASER | |
| INVENTIVE EXAMPLE | C2 | B2 | $3 \times 10^4$ | 7 | EXIST-ENCE | NONE | 22 | GLASS FILM | 1.924 | 0.81 | 0.69 | LASER | |
| INVENTIVE EXAMPLE | C3 | B3 | $8 \times 10^3$ | 12 | EXIST-ENCE | NONE | 7 | GLASS FILM | 1.930 | 0.82 | 0.71 | TOOTHED GEAR | |
| INVENTIVE EXAMPLE | C4 | B4 | $4 \times 10^3$ | 20 | EXIST-ENCE | NONE | 9 | GLASS FILM | 1.929 | 0.83 | 0.69 | TOOTHED GEAR | |
| INVENTIVE EXAMPLE | C5 | B5 | $2 \times 10^3$ | 18 | EXIST-ENCE | NONE | 11 | GLASS FILM | 1.921 | 0.80 | 0.68 | TOOTHED GEAR | |
| INVENTIVE EXAMPLE | C6 | B6 | $4 \times 10^3$ | 17 | EXIST-ENCE | EXIST-ENCE | 20 | GLASS FILM | 1.925 | 0.84 | 0.67 | ELECTRON BEAM | |
| INVENTIVE EXAMPLE | C7 | B7 | $1 \times 10^3$ | 10 | EXIST-ENCE | NONE | 3 | GLASS FILM | 1.933 | 0.82 | 0.68 | ELECTRON BEAM | |
| INVENTIVE EXAMPLE | C8 | B8 | $7 \times 10^2$ | 7 | EXIST-ENCE | NONE | 2 | GLASS FILM | 1.928 | 0.81 | 0.65 | LASER | |
| INVENTIVE EXAMPLE | C9 | B9 | $4 \times 10^3$ | 11 | EXIST-ENCE | NONE | 1 | GLASS FILM | 1.928 | 0.82 | 0.66 | LASER | |
| INVENTIVE EXAMPLE | C10 | B10 | $3 \times 10^2$ | 18 | EXIST-ENCE | NONE | 4 | GLASS FILM | 1.924 | 0.82 | 0.67 | LASER | |
| INVENTIVE EXAMPLE | C11 | B11 | $2 \times 10^2$ | 15 | EXIST-ENCE | NONE | 5 | GLASS FILM | 1.922 | 0.80 | 0.69 | ETCHING | |
| INVENTIVE EXAMPLE | C12 | B12 | $3 \times 10^3$ | 9 | EXIST-ENCE | NONE | 12 | GLASS FILM | 1.926 | 0.84 | 0.70 | ETCHING | |
| INVENTIVE EXAMPLE | C13 | B13 | $4 \times 10^5$ | 12 | EXIST-ENCE | NONE | 18 | GLASS FILM | 1.933 | 0.81 | 0.69 | ETCHING | |
| INVENTIVE EXAMPLE | C14 | B14 | $1 \times 10^6$ | 17 | EXIST-ENCE | NONE | 1 | GLASS FILM | 1.921 | 0.79 | 0.69 | LASER | |
| INVENTIVE EXAMPLE | C15 | B15 | $5 \times 10^4$ | 19 | EXIST-ENCE | EXIST-ENCE | 20 | GLASS FILM | 1.931 | 0.80 | 0.65 | LASER | |
| COMPARATIVE EXAMPLE | c1 | b1 | — | — | NONE | NONE | 0.1 | GLASS FILM | 1.922 | 0.90 | 0.81 | LASER | |
| COMPARATIVE EXAMPLE | c2 | b2 | — | — | NONE | NONE | 0.6 | GLASS FILM | 1.921 | 0.92 | 0.83 | LASER | |
| COMPARATIVE EXAMPLE | c3 | b3 | — | — | NONE | NONE | 0.2 | GLASS FILM | 1.922 | 0.94 | 0.85 | TOOTHED GEAR | B COMPOUND: NOT EXISTENCE |
| COMPARATIVE EXAMPLE | c4 | b4 | — | — | NONE | NONE | 0.1 | GLASS FILM | 1.925 | 0.92 | 0.83 | TOOTHED GEAR | B COMPOUND: NOT EXISTENCE |

TABLE 2-continued

| | | | B COMPOUND | | | | | | MAGNETIC CHARACTERISTICS | | | | |
|---|---|---|---|---|---|---|---|---|---|---|---|---|---|
| | No. | STEEL No. | NUMBER DENSITY (pieces/$mm^3$) | MAJOR AXIS LENGTH (μm) | $Fe_2B$ | $Fe_3B$ | GDS $I_{B\_t\,(center)}/I_{B\_t\,(surface)}$ | LOWER LAYER | MAGNETIC FLUX DENSITY $B_8$ (T) | IRON LOSS $W_{17/50}$ (W/kg) | IRON LOSS AFTER CONTROLLING MAGNETIC DOMAIN $W_{17/50}$ (W/kg) | METHOD FOR CONTROLLING MAGNETIC DOMAIN | NOTE |
| COMPARATIVE EXAMPLE | c5 | b5 | — | — | NONE | NONE | 0.1 | GLASS FILM | 1.922 | 0.94 | 0.85 | TOOTHED GEAR | B COMPOUND: NOT EXISTENCE |
| COMPARATIVE EXAMPLE | c6 | b6 | — | — | NONE | NONE | 0.2 | GLASS FILM | 1.924 | 0.91 | 0.82 | LASER | B COMPOUND: NOT EXISTENCE |
| COMPARATIVE EXAMPLE | c7 | b7 | — | — | NONE | NONE | 0.5 | GLASS FILM | 1.923 | 0.89 | 0.80 | ETCHING | B COMPOUND: NOT EXISTENCE |
| COMPARATIVE EXAMPLE | c8 | b8 | — | — | NONE | NONE | 0.8 | GLASS FILM | 1.921 | 0.89 | 0.80 | ETCHING | B COMPOUND: NOT EXISTENCE |
| COMPARATIVE EXAMPLE | c9 | b9 | — | — | NONE | NONE | 0.2 | GLASS FILM | 1.919 | 0.99 | 0.89 | ELECTRON BEAM | B COMPOUND: NOT EXISTENCE |
| COMPARATIVE EXAMPLE | c10 | b10 | — | — | NONE | NONE | 0.2 | GLASS FILM | 1.899 | 1.01 | 0.91 | ELECTRON BEAM | B COMPOUND: NOT EXISTENCE |
| COMPARATIVE EXAMPLE | c11 | b11 | $3 \times 10^6$ | 15 | EXIST-ENCE | NONE | 43 | GLASS FILM | 1.923 | 0.91 | 0.82 | ELECTRON BEAM | B COMPOUND: EXCESS PRECIPITATE |

Example 2

The grain oriented electrical steel sheet (final product) was produced by the same method as in Example 1. For controlling the magnetic domain, mechanical treatment, laser irradiation, electron beam irradiation, and the like were conducted for the product.

In D6, the magnetic domain controlling was conducted before final annealing. In D7, the magnetic domain controlling was conducted after final annealing and before forming the insulation coating. In D8, the steel sheet was held at 1200° C. for 20 hours, was cooled by 5° C./hour in the temperature range of 1200 to 1000° C., and then, was cooled by 20° C./hour in the temperature range of 1000 to 600° C. In D9, the steel sheet was held at 1200° C. for 20 hours, was cooled by 40° C./hour in the temperature range of 1200 to 1000° C., and then, was cooled by 5° C./hour in the temperature range of 1000 to 600° C. In D10, the steel sheet was held at 1200° C. for 20 hours, was cooled by 40° C./hour in the temperature range of 1200 to 1000° C., and then, was cooled by 20° C./hour in the temperature range of 1000 to 600° C. In addition, the cooling atmosphere of D6 to D9 was the same as that of D1 to D5. In D10, the cooling atmosphere in the temperature range of 1200 to 600° C. was 100% of Ar, and the cooling atmosphere in the temperature range of less than 600° C. was 100% of $N_2$. Except for the above conditions, D6 to D10 were produced by the same producing method of D1 to D5.

In d1, the slab was heated to 1270° C., and then, was subjected to the hot rolling. In d2, the slab was heated to 1300° C., and then, was subjected to the hot rolling. In d3, the annealing separator was applied, and then, the annealing was conducted at 1200° C. for 3 hours in hydrogen gas atmosphere. In d4, the annealing separator was applied, and then, the annealing was conducted at 1200° C. for 5 hours in hydrogen gas atmosphere. In d5, the steel sheet was held at 1200° C. for 20 hours, was cooled by 60° C./hour in the temperature range of 1200 to 1000° C., and then, was cooled by 20° C./hour in the temperature range of 1000 to 600° C. In d6, the steel sheet was held at 1200° C. for 20 hours, was cooled by 40° C./hour in the temperature range of 1200 to 1000° C., and then, was cooled by 40° C./hour in the temperature range of 1000 to 600° C.

Except for the above conditions, d1 to d6 were produced by the same producing method of D1 to D5.

The structural features and characteristics of the inventive examples and comparative examples are shown in Table 3. At the time, the t (surface) was 300 to 400 seconds, and the t (center) was 400 to 900 seconds.

TABLE 3

| | | | B COMPOUND | | | | | | MAGNETIC CHARACTERISTICS | | | |
|---|---|---|---|---|---|---|---|---|---|---|---|---|
| | No. | STEEL No. | NUMBER DENSITY (pieces/$mm^3$) | MAJOR AXIS LENGTH (μm) | $Fe_2B$ | $Fe_3B$ | GDS $I_{B\_t\ (center)}$/$I_{B\_t\ (surface)}$ | LOWER LAYER | MAGNETIC FLUX DENSITY $B_8$ (T) | IRON LOSS $W_{17/50}$ (W/kg) | IRON LOSS AFTER CONTROLLING MAGNETIC DOMAIN $W_{17/50}$ (W/kg) | METHOD FOR CONTROLLING MAGNETIC DOMAIN |
| INVENTIVE EXAMPLE | D1 | B1 | $2 \times 10^5$ | 12 | EXIST-ENCE | EXIST-ENCE | 11 | GLASS FILM | 1.923 | 0.82 | 0.67 | LASER |
| INVENTIVE EXAMPLE | D2 | B2 | $7 \times 10^2$ | 18 | EXIST-ENCE | NONE | 9 | GLASS FILM | 1.924 | 0.81 | 0.69 | LASER |
| INVENTIVE EXAMPLE | D3 | B3 | $4 \times 10^3$ | 20 | EXIST-ENCE | NONE | 10 | GLASS FILM | 1.930 | 0.82 | 0.71 | TOOTHED GEAR |
| INVENTIVE EXAMPLE | D4 | B4 | $3 \times 10^2$ | 15 | EXIST-ENCE | NONE | 12 | GLASS FILM | 1.929 | 0.83 | 0.69 | ELECTRON BEAM |
| INVENTIVE EXAMPLE | D5 | B5 | $4 \times 10^4$ | 11 | EXIST-ENCE | EXIST-ENCE | 6 | GLASS FILM | 1.921 | 0.8 | 0.68 | ELECTRON BEAM |
| INVENTIVE EXAMPLE | D6 | B6 | $4 \times 10^3$ | 12 | EXIST-ENCE | EXIST-ENCE | 12 | GLASS FILM | 1.890 | 0.72 | 0.72 | LASER BEFOR FINAL ANNEALING |
| INVENTIVE EXAMPLE | D7 | B7 | $7 \times 10^2$ | 12 | EXIST-ENCE | NONE | 13 | GLASS FILM | 1.888 | 0.71 | 0.71 | LASER AFTER FINAL ANNEALING |
| INVENTIVE EXAMPLE | D8 | B6 | $8 \times 10^3$ | 12 | EXIST-ENCE | EXIST-ENCE | 10 | GLASS FILM | 1.923 | 0.82 | 0.69 | TOOTHED GEAR |
| INVENTIVE EXAMPLE | D9 | B8 | $7 \times 10^3$ | 12 | EXIST-ENCE | EXIST-ENCE | 12 | GLASS FILM | 1.922 | 0.83 | 0.68 | TOOTHED GEAR |
| INVENTIVE EXAMPLE | D10 | B9 | $8 \times 10^3$ | 15 | EXIST-ENCE | EXIST-ENCE | 8 | GLASS FILM | 1.923 | 0.82 | 0.70 | TOOTHED GEAR |
| COMPARATIVE EXAMPLE | d1 | B1 | — | — | NONE | NONE | 0.5 | GLASS FILM | 1.872 | 1.02 | 0.91 | LASER |
| COMPARATIVE EXAMPLE | d2 | B2 | — | — | NONE | NONE | 0.3 | GLASS FILM | 1.882 | 0.99 | 0.92 | LASER |
| COMPARATIVE EXAMPLE | d3 | B3 | — | — | NONE | NONE | 0.7 | GLASS FILM | 1.923 | 0.92 | 0.78 | ELECTRON BEAM |
| COMPARATIVE EXAMPLE | d4 | B4 | — | — | NONE | NONE | 0.8 | GLASS FILM | 1.931 | 0.89 | 0.81 | ELECTRON BEAM |
| COMPARATIVE EXAMPLE | d5 | B5 | $2 \times 10^8$ | 0.5 | EXIST-ENCE | EXIST-ENCE | 12 | GLASS FILM | 1.921 | 0.91 | 0.82 | ELECTRON BEAM |
| COMPARATIVE EXAMPLE | d6 | B7 | $2 \times 10^9$ | 0.2 | EXIST-ENCE | EXIST-ENCE | 11 | GLASS FILM | 1.924 | 0.89 | 0.81 | TOOTHED GEAR |

In the inventive examples D1 to D10 in which the B emission intensity $I_{B\_t(center)}$ to the center region and the B emission intensity $I_{B\_t(surface)}$ to the surface region satisfied the above expression (1), the grain oriented electrical steel sheets with excellent magnetic characteristics were obtained. On the other hand, in d1 to d6 in which any production condition was out of the range described above, the magnetic characteristics were insufficient.

Example 3

The steel slab whose chemical composition was shown in Table 4-1 was heated to 1150° C. The steel slab was hot-rolled to obtain the hot rolled steel sheet whose thickness was 2.6 mm. The hot rolled steel sheet was subjected to the hot band annealing in which the hot rolled steel sheet was annealed at 1100° C. and then annealed at 900° C. The steel sheet after hot band annealing was cold-rolled once or cold-rolled plural times with the intermediate annealing to obtain the cold rolled steel sheet whose thickness was 0.22 mm.

TABLE 4-1

| | SLAB | CHEMICAL COMPOSITION (mass %) | | | | | | | | |
|---|---|---|---|---|---|---|---|---|---|---|
| | No. | C | Si | Mn | Al | N | S | Se | Seq | B |
| INVENTIVE EXAMPLE | E1 | 0.085 | 3.45 | 0.10 | 0.028 | 0.004 | 0.008 | 0 | 0.008 | 0.0015 |
| | E2 | 0.031 | 1.21 | 0.10 | 0.029 | 0.010 | 0.009 | 0 | 0.009 | 0.0020 |
| | E3 | 0.033 | 6.52 | 0.10 | 0.029 | 0.010 | 0.007 | 0 | 0.007 | 0.0018 |
| | E4 | 0.041 | 3.45 | 0.08 | 0.028 | 0.007 | 0.005 | 0 | 0.005 | 0.0019 |
| | E5 | 0.044 | 3.33 | 0.80 | 0.029 | 0.006 | 0.004 | 0 | 0.004 | 0.0021 |
| | E6 | 0.052 | 4.52 | 0.12 | 0.020 | 0.005 | 0.003 | 0 | 0.003 | 0.0016 |
| | E7 | 0.055 | 3.12 | 0.09 | 0.055 | 0.002 | 0.001 | 0 | 0.001 | 0.0017 |
| | E8 | 0.061 | 2.81 | 0.09 | 0.030 | 0.012 | 0.009 | 0 | 0.009 | 0.0018 |
| | E9 | 0.062 | 3.12 | 0.11 | 0.030 | 0.004 | 0.001 | 0 | 0.001 | 0.0019 |
| | E10 | 0.071 | 2.92 | 0.13 | 0.030 | 0.005 | 0.001 | 0 | 0.001 | 0.0021 |
| | E11 | 0.078 | 3.45 | 0.12 | 0.028 | 0.011 | 0.010 | 0 | 0.010 | 0.0022 |
| | E12 | 0.055 | 3.44 | 0.10 | 0.027 | 0.009 | 0.007 | 0 | 0.007 | 0.0006 |
| | E13 | 0.085 | 4.21 | 0.10 | 0.027 | 0.008 | 0.006 | 0 | 0.006 | 0.0078 |
| | E14 | 0.082 | 3.45 | 0.11 | 0.031 | 0.010 | 0.008 | 0 | 0.008 | 0.0025 |
| | E15 | 0.045 | 3.35 | 0.12 | 0.030 | 0.006 | 0.009 | 0 | 0.009 | 0.0017 |
| COMPARATIVE EXAMPLE | e1 | 0.092 | 3.45 | 0.12 | 0.029 | 0.002 | 0.007 | 0 | 0.007 | 0.0002 |
| | e2 | 0.076 | 0.50 | 0.08 | 0.028 | 0.003 | 0.007 | 0 | 0.007 | 0.0004 |
| | e3 | 0.065 | 8.00 | 0.09 | 0.028 | 0.003 | 0.007 | 0 | 0.007 | 0.0004 |
| | e4 | 0.045 | 3.45 | 0.04 | 0.029 | 0.002 | 0.009 | 0 | 0.009 | 0.0002 |
| | e5 | 0.061 | 3.35 | 1.21 | 0.029 | 0.004 | 0.009 | 0 | 0.009 | 0.0006 |
| | e6 | 0.032 | 3.25 | 0.08 | 0.005 | 0.004 | 0.006 | 0 | 0.006 | 0.0007 |
| | e7 | 0.012 | 3.12 | 0.07 | 0.082 | 0.003 | 0.006 | 0 | 0.006 | 0.0009 |
| | e8 | 0.043 | 3.45 | 0.10 | 0.027 | 0.015 | 0.009 | 0 | 0.009 | 0.0003 |
| | e9 | 0.039 | 3.15 | 0.08 | 0.026 | 0.002 | 0.030 | 0 | 0.030 | 0.0002 |
| | e10 | 0.058 | 3.28 | 0.10 | 0.027 | 0.002 | 0.007 | 0 | 0.007 | 0.0003 |
| | e11 | 0.021 | 3.19 | 0.13 | 0.028 | 0.004 | 0.007 | 0 | 0.007 | 0.0152 |

The cold rolled steel sheet with final thickness of 0.22 mm was subjected to the decarburization annealing in which the soaking was conducted at 860° C. in moist atmosphere. The nitridation (annealing to increase the nitrogen content of steel sheet) was conducted for the steel sheet after decarburization annealing. The annealing separator which included alumina as the main component was applied to the steel sheet after nitridation, and then the steel sheet was held at 1200° C. for 20 hours in hydrogen gas atmosphere. The steel sheet after being held was cooled by 40° C./hour in the temperature range of 1200 to 1000° C. and by 20° C./hour in the temperature range of 1000 to 600° C. At the time, the atmosphere during cooling was 100% of $H_2$ in the temperature range of 1200 to 600° C. and 100% of $N_2$ in the temperature range of less than 600° C.

The excess alumina was removed from the steel sheet after being annealed, and then, the insulation coating which included phosphate and colloidal silica as main components was formed on the steel sheet to obtain the final product.

The chemical composition of the base steel sheet in the product is shown in Table 4-2.

TABLE 4-2

| | STEEL | SLAB | CHEMICAL COMPOSITION (mass %) | | | | | | | | |
|---|---|---|---|---|---|---|---|---|---|---|---|
| | No. | No. | C | Si | Mn | Al | N | S | Se | Seq | B |
| INVENTIVE EXAMPLE | F1 | E1 | 0.080 | 3.45 | 0.10 | 0.028 | 0.0021 | 0.0021 | 0 | 0.0021 | 0.0015 |
| | F2 | E2 | 0.031 | 1.21 | 0.10 | 0.029 | 0.0031 | 0.0032 | 0 | 0.0032 | 0.0020 |

TABLE 4-2-continued

| | STEEL No. | SLAB No. | CHEMICAL COMPOSITION (mass %) C | Si | Mn | Al | N | S | Se | Seq | B |
|---|---|---|---|---|---|---|---|---|---|---|---|
| | F3 | E3 | 0.001 | 6.52 | 0.10 | 0.029 | 0.0012 | 0.0012 | 0 | 0.0012 | 0.0018 |
| | F4 | E4 | 0.003 | 3.45 | 0.08 | 0.028 | 0.0010 | 0.0007 | 0 | 0.0007 | 0.0019 |
| | F5 | E5 | 0.005 | 3.33 | 0.80 | 0.029 | 0.0021 | 0.0005 | 0 | 0.0005 | 0.0021 |
| | F6 | E6 | 0.001 | 4.52 | 0.12 | 0.020 | 0.0019 | 0.0007 | 0 | 0.0007 | 0.0016 |
| | F7 | E7 | 0.002 | 3.12 | 0.09 | 0.055 | 0.0017 | 0.0008 | 0 | 0.0008 | 0.0017 |
| | F8 | E8 | 0.003 | 2.81 | 0.09 | 0.030 | 0.0006 | 0.0009 | 0 | 0.0009 | 0.0018 |
| | F9 | E9 | 0.007 | 3.12 | 0.11 | 0.030 | 0.0039 | 0.0051 | 0 | 0.0051 | 0.0019 |
| | F10 | E10 | 0.006 | 2.92 | 0.13 | 0.030 | 0.0022 | 0.0004 | 0 | 0.0004 | 0.0021 |
| | F11 | E11 | 0.012 | 3.45 | 0.12 | 0.028 | 0.0018 | 0.0092 | 0 | 0.0092 | 0.0022 |
| | F12 | E12 | 0.011 | 3.44 | 0.10 | 0.027 | 0.0019 | 0.0007 | 0 | 0.0007 | 0.0006 |
| | F13 | E13 | 0.002 | 4.21 | 0.10 | 0.027 | 0.0010 | 0.0081 | 0 | 0.0081 | 0.0078 |
| | F14 | E14 | 0.003 | 3.45 | 0.11 | 0.031 | 0.0009 | 0.0005 | 0 | 0.0005 | 0.0025 |
| | F15 | E15 | 0.001 | 3.35 | 0.12 | 0.030 | 0.0008 | 0.0005 | 0 | 0.0005 | 0.0017 |
| COMPARATIVE EXAMPLE | f1 | e1 | 0.090 | 3.45 | 0.12 | 0.029 | 0.0019 | 0.0065 | 0 | 0.0065 | 0.0002 |
| | f2 | e2 | 0.008 | 0.50 | 0.08 | 0.028 | 0.0028 | 0.0067 | 0 | 0.0067 | 0.0004 |
| | f3 | e3 | 0.001 | 8.00 | 0.09 | 0.028 | 0.0031 | 0.0068 | 0 | 0.0068 | 0.0004 |
| | f4 | e4 | 0.002 | 3.45 | 0.04 | 0.029 | 0.0021 | 0.0088 | 0 | 0.0088 | 0.0002 |
| | f5 | e5 | 0.001 | 3.35 | 1.21 | 0.029 | 0.0035 | 0.0091 | 0 | 0.0091 | 0.0006 |
| | f6 | e6 | 0.012 | 3.25 | 0.08 | 0.005 | 0.0038 | 0.0062 | 0 | 0.0062 | 0.0007 |
| | f7 | e7 | 0.011 | 3.12 | 0.07 | 0.082 | 0.0032 | 0.0059 | 0 | 0.0059 | 0.0009 |
| | f8 | e8 | 0.002 | 3.45 | 0.10 | 0.027 | 0.0152 | 0.0091 | 0 | 0.0091 | 0.0003 |
| | f9 | e9 | 0.020 | 3.15 | 0.08 | 0.026 | 0.0022 | 0.0300 | 0 | 0.0300 | 0.0002 |
| | f10 | e10 | 0.010 | 3.28 | 0.10 | 0.027 | 0.0019 | 0.0065 | 0 | 0.0065 | 0.0003 |
| | f11 | e11 | 0.002 | 3.19 | 0.13 | 0.028 | 0.0036 | 0.0067 | 0 | 0.0067 | 0.0152 |

<Magnetic Domain Controlling>

For controlling the magnetic domain, mechanical treatment, laser irradiation, electron beam irradiation, and the like were conducted. Some steel sheets was subjected to the magnetic domain controlling in which the groove was made by etching and laser irradiation.

As to the inventive examples and comparative examples, the type, number density, and major axis length of B compound were determined by the same methods as in Examples 1 and 2. Moreover, the magnetic characteristics were measured by the same methods as in Examples 1 and 2.

<GDS ($I_{B(d/2)}$>/$I_{B(d/10)}$)>

When a total thickness of the base steel sheet and the intermediate layer was referred to as d, when a B emission intensity at a depth of d/2 from a surface of the intermediate layer in a case where a B emission intensity is measured by a glow discharge emission spectroscopy (GDS) from the surface of the intermediate layer was referred to as $I_{B(d/2)}$, and when a B emission intensity at a depth of d/10 from the surface of the intermediate layer was referred to as $I_{B(d/10)}$, the $I_{B(d/2)}$ and the $I_{B(d/10)}$ were measured, and then the ratio $I_{B(d/2)}/I_{B(d/10)}$ was calculated.

The total thickness d of the base steel sheet and the intermediate layer was measured with a micrometer or a thickness gauge.

In order to determine "the depth of d/2 from the surface of the intermediate layer" and "the depth of d/10 from the surface of the intermediate layer", the point where Ar sputtering was stable between 1 to 10 seconds was defined as the surface of the intermediate layer. Thereafter, based on the d determined by above method using the surface of the intermediate layer defined above, "the depth of d/2 from the surface of the intermediate layer" and "the depth of d/10 from the surface of the intermediate layer" were determined.

The structural features and characteristics of the inventive examples and comparative examples are shown in Table 5. In the inventive examples G1 to G15 which satisfied the inventive conditions, the grain oriented electrical steel sheets with excellent magnetic characteristics were obtained as compared with the comparative examples.

TABLE 5

| | No. | STEEL No. | B COMPOUND NUMBER DENSITY (pieces/mm$^3$) | B COMPOUND MAJOR AXIS LENGTH (μm) | B COMPOUND $Fe_2B$ | B COMPOUND $Fe_3B$ | GDS B EMISSION INTENSITY $I_{B(d/2)}/I_{B(d/10)}$ | GDS LOWER LAYER | MAGNETIC CHARACTERISTICS MAGNETIC FLUX DENSITY $B_8$ (T) | MAGNETIC CHARACTERISTICS IRON LOSS $W_{17/50}$ (W/kg) | MAGNETIC CHARACTERISTICS IRON LOSS AFTER CONTROLLING MAGNETIC DOMAIN $W_{17/50}$ (W/kg) | METHOD FOR CONTROLLING MAGNETIC DOMAIN | NOTE |
|---|---|---|---|---|---|---|---|---|---|---|---|---|---|
| INVENTIVE EXAMPLE | G1 | F1 | $2 \times 10^5$ | 3 | EXISTENCE | EXISTENCE | 12 | INTERMEDIATE LAYER | 1.948 | 1.07 | 0.61 | GROOVE BY LASER | |
| | G2 | F2 | $3 \times 10^4$ | 5 | EXISTENCE | NONE | 20 | INTERMEDIATE LAYER | 1.949 | 1.06 | 0.63 | GROOVE BY LASER | |
| | G3 | F3 | $4 \times 10^3$ | 12 | EXISTENCE | NONE | 13 | INTERMEDIATE LAYER | 1.955 | 1.07 | 0.65 | GROOVE BY TOOTHED GEAR | |
| | G4 | F4 | $2 \times 10^3$ | 7 | NONE | EXISTENCE | 19 | INTERMEDIATE LAYER | 1.954 | 1.08 | 0.63 | GROOVE BY TOOTHED GEAR | |
| | G5 | F5 | $2 \times 10^3$ | 19 | EXISTENCE | NONE | 15 | INTERMEDIATE LAYER | 1.946 | 1.05 | 0.62 | GROOVE BY TOOTHED GEAR | |
| | G6 | F6 | $4 \times 10^3$ | 18 | EXISTENCE | EXISTENCE | 6 | INTERMEDIATE LAYER | 1.950 | 1.09 | 0.61 | GROOVE BY ELECTRON BEAM | |
| | G7 | F7 | $1 \times 10^3$ | 11 | EXISTENCE | NONE | 5 | INTERMEDIATE LAYER | 1.958 | 1.07 | 0.62 | GROOVE BY ELECTRON BEAM | |
| | G8 | F8 | $2 \times 10^2$ | 20 | EXISTENCE | NONE | 11 | INTERMEDIATE LAYER | 1.953 | 1.06 | 0.59 | GROOVE BY LASER | |
| | G9 | F9 | $4 \times 10^3$ | 12 | NONE | EXISTENCE | 8 | INTERMEDIATE LAYER | 1.953 | 1.07 | 0.60 | GROOVE BY LASER | |
| | G10 | F10 | $3 \times 10^2$ | 14 | EXISTENCE | NONE | 11 | INTERMEDIATE LAYER | 1.949 | 1.07 | 0.61 | GROOVE BY LASER | |
| | G11 | F11 | $2 \times 10^2$ | 8 | NONE | EXISTENCE | 17 | INTERMEDIATE LAYER | 1.947 | 1.05 | 0.63 | GROOVE BY ETCHING | |
| | G12 | F12 | $3 \times 10^3$ | 7 | EXISTENCE | NONE | 18 | INTERMEDIATE LAYER | 1.951 | 1.09 | 0.64 | GROOVE BY ETCHING | |
| | G13 | F13 | $2 \times 10^3$ | 9 | EXISTENCE | NONE | 20 | INTERMEDIATE LAYER | 1.958 | 1.06 | 0.63 | GROOVE BY ETCHING | |
| | G14 | F14 | $2 \times 10^2$ | 13 | EXISTENCE | NONE | 31 | INTERMEDIATE LAYER | 1.946 | 1.04 | 0.63 | GROOVE BY LASER | |
| | G15 | F15 | $5 \times 10^4$ | 19 | EXISTENCE | EXISTENCE | 12 | INTERMEDIATE LAYER | 1.956 | 1.05 | 0.59 | GROOVE BY LASER | |
| COMPARATIVE EXAMPLE | g1 | f1 | — | — | NONE | NONE | 0.5 | INTERMEDIATE LAYER | 1.947 | 1.15 | 0.68 | GROOVE BY LASER | B COMPOUND: NOT EXISTENCE |

TABLE 5-continued

| No. | STEEL No. | B COMPOUND: NUMBER DENSITY (pieces/mm$^3$) | B COMPOUND: MAJOR AXIS LENGTH (μm) | B COMPOUND: $Fe_2B$ | B COMPOUND: $Fe_3B$ | GDS: B EMISSION INTENSITY $I_{B\,(d/2)}/I_{B\,(d/10)}$ | GDS: LOWER LAYER | MAGNETIC CHARACTERISTICS: MAGNETIC FLUX DENSITY $B_8$ (T) | MAGNETIC CHARACTERISTICS: IRON LOSS $W_{17/50}$ (W/kg) | MAGNETIC CHARACTERISTICS: IRON LOSS AFTER CONTROLLING MAGNETIC DOMAIN $W_{17/50}$ (W/kg) | METHOD FOR CONTROLLING MAGNETIC DOMAIN | NOTE |
|---|---|---|---|---|---|---|---|---|---|---|---|---|
| g2 | f2 | 1 × 10$^9$ | 11 | NONE | EXIST-ENCE | 11 | INTERMEDIATE LAYER | 1.946 | 1.17 | 0.69 | GROOVE BY LASER | B COMPOUND: EXCESS PRECIPITATE |
| g3 | f3 | — | — | NONE | NONE | 0.6 | INTERMEDIATE LAYER | 1.947 | 1.19 | 0.71 | GROOVE BY TOOTHED GEAR | B COMPOUND: NOT EXISTENCE |
| g4 | f4 | 2 × −10$^6$ | 12 | EXIST-ENCE | NONE | 5 | INTERMEDIATE LAYER | 1.950 | 1.17 | 0.69 | GROOVE BY TOOTHED GEAR | B COMPOUND: EXCESS PRECIPITATE |
| g5 | f5 | — | — | NONE | NONE | 0.5 | INTERMEDIATE LAYER | 1.947 | 1.19 | 0.71 | GROOVE BY TOOTHED GEAR | B COMPOUND: NOT EXISTENCE |
| g6 | f6 | — | — | NONE | NONE | 0.8 | INTERMEDIATE LAYER | 1.949 | 1.16 | 0.69 | GROOVE BY LASER | B COMPOUND: NOT EXISTENCE |
| g7 | f7 | — | — | NONE | NONE | 0.9 | INTERMEDIATE LAYER | 1.948 | 1.14 | 0.67 | GROOVE BY ETCHING | B COMPOUND: NOT EXISTENCE |
| g8 | f8 | — | — | NONE | NONE | 0.7 | INTERMEDIATE LAYER | 1.946 | 1.14 | 0.67 | GROOVE BY ETCHING | B COMPOUND: NOT EXISTENCE |
| g9 | f9 | — | — | NONE | NONE | 0.7 | INTERMEDIATE LAYER | 1.944 | 1.24 | 0.74 | GROOVE BY ELECTRON BEAM | B COMPOUND: NOT EXISTENCE |
| g10 | f10 | — | — | NONE | NONE | 0.9 | INTERMEDIATE LAYER | 1.924 | 1.26 | 0.76 | GROOVE BY ELECTRON BEAM | B COMPOUND: NOT EXISTENCE |
| g11 | f11 | 3 × 10$^6$ | 11 | EXIST-ENCE | NONE | 12 | INTERMEDIATE LAYER | 1.948 | 1.16 | 0.69 | GROOVE BY ELECTRON BEAM | B COMPOUND: EXCESS PRECIPITATE |

Example 4

The grain oriented electrical steel sheet (final product) was produced by the same method as in Example 3. For controlling the magnetic domain, mechanical treatment, laser irradiation, electron beam irradiation, and the like were conducted for the product.

In H6, the magnetic domain controlling was conducted before final annealing. In H7, the magnetic domain controlling was conducted after final annealing and before forming the insulation coating. In H8, the steel sheet was held at 1200° C. for 20 hours, was cooled by 5° C./hour in the temperature range of 1200 to 1000° C., and then, was cooled by 20° C./hour in the temperature range of 1000 to 600° C. In H9, the steel sheet was held at 1200° C. for 20 hours, was cooled by 40° C./hour in the temperature range of 1200 to 1000° C., and then, was cooled by 5° C./hour in the temperature range of 1000 to 600° C. In H10, the steel sheet was held at 1200° C. for 20 hours, was cooled by 40° C./hour in the temperature range of 1200 to 1000° C., and then, was cooled by 20° C./hour in the temperature range of 1000 to 600° C. In addition, the cooling atmosphere of H6 to H9 was the same as that of H1 to H5. In H10, the cooling atmosphere in the temperature range of 1200 to 600° C. was 100% of Ar, and the cooling atmosphere in the temperature range of less than 600° C. was 100% of $N_2$. Except for the above conditions, H6 to H10 were produced by the same producing method of H1 to H5.

In h1, the slab was heated to 1270° C., and then, was subjected to the hot rolling. In h2, the slab was heated to 1300° C., and then, was subjected to the hot rolling. In h3, the annealing separator was applied, and then, the annealing was conducted at 1200° C. for 3 hours in hydrogen gas atmosphere. In h4, the annealing separator was applied, and then, the annealing was conducted at 1200° C. for 5 hours in hydrogen gas atmosphere. In h5, the steel sheet was held at 1200° C. for 20 hours, was cooled by 60° C./hour in the temperature range of 1200 to 1000° C., and then, was cooled by 20° C./hour in the temperature range of 1000 to 600° C. In h6, the steel sheet was held at 1200° C. for 20 hours, was cooled by 40° C./hour in the temperature range of 1200 to 1000° C., and then, was cooled by 40° C./hour in the temperature range of 1000 to 600° C.

Except for the above conditions, h1 to h6 were produced by the same producing method of H1 to H5.

The structural features and characteristics of the inventive examples and comparative examples are shown in Table 6.

TABLE 6

| | | | B COMPOUND | | | | GDS | | MAGNETIC CHARACTERISTICS | | | |
|---|---|---|---|---|---|---|---|---|---|---|---|---|
| | | | | | | | | | | | IRON LOSS AFTER CONTROLLING | |
| | No. | STEEL No. | NUMBER DENSITY (pieces/ $mm^3$) | MAJOR AXIS LENGTH (μm) | $Fe_2B$ | $Fe_3B$ | B EMISSION INTENSITY $I_{B(d/2)}/I_{B(d/10)}$ | LOWER LAYER | MAGNETIC FLUX DENSITY $b_8$ (T) | IRON LOSS $W_{17/50}$ (W/kg) | MAGNETIC DOMAIN $W_{17/50}$ (W/kg) | METHOD FOR CONTROLLING MAGNETIC DOMAIN |
| INVENTIVE EXAMPLE | H1 | F1 | $2 \times 10^5$ | 12 | EXIST-ENCE | EXIST-ENCE | 11 | INTERMEDIATE LAYER | 1.953 | 1.09 | 0.62 | GROOVE BY LASER |
| INVENTIVE EXAMPLE | H2 | F2 | $2 \times 10^2$ | 18 | NONE | EXIST-ENCE | 9 | INTERMEDIATE LAYER | 1.951 | 1.08 | 0.61 | GROOVE BY ETCHING |
| INVENTIVE EXAMPLE | H3 | F3 | $3 \times 10^3$ | 16 | NONE | EXIST-ENCE | 10 | INTERMEDIATE LAYER | 1.955 | 1.11 | 0.63 | GROOVE BY TOOTHED GEAR |
| INVENTIVE EXAMPLE | H4 | F4 | $1 \times 10^2$ | 8 | EXIST-ENCE | NONE | 12 | INTERMEDIATE LAYER | 1.949 | 1.08 | 0.61 | ELECTRON BEAM |
| INVENTIVE EXAMPLE | H5 | F5 | $1 \times 10^4$ | 19 | EXIST-ENCE | EXIST-ENCE | 6 | INTERMEDIATE LAYER | 1.948 | 1.08 | 0.62 | ELECTRON BEAM |
| INVENTIVE EXAMPLE | H6 | F6 | $4 \times 10^3$ | 12 | EXIST-ENCE | EXIST-ENCE | 12 | INTERMEDIATE LAYER | 1.920 | 0.62 | 0.62 | LASER BEFOR FINAL ANNEALING |
| INVENTIVE EXAMPLE | H7 | F7 | $7 \times 10^2$ | 12 | EXIST-ENCE | NONE | 13 | INTERMEDIATE LAYER | 1.918 | 0.61 | 0.61 | LASER AFTER FINAL ANNEALING |
| INVENTIVE EXAMPLE | H8 | F6 | $8 \times 10^3$ | 12 | EXIST-ENCE | EXIST-ENCE | 10 | INTERMEDIATE LAYER | 1.953 | 1.01 | 0.62 | TOOTHED GEAR |
| INVENTIVE EXAMPLE | H9 | F8 | $7 \times 10^3$ | 12 | EXIST-ENCE | EXIST-ENCE | 12 | INTERMEDIATE LAYER | 1.952 | 1.01 | 0.63 | TOOTHED GEAR |
| INVENTIVE EXAMPLE | H10 | F9 | $8 \times 10^3$ | 15 | EXIST-ENCE | EXIST-ENCE | 8 | INTERMEDIATE LAYER | 1.953 | 1.02 | 0.63 | TOOTHED GEAR |
| COMPARATIVE EXAMPLE | h1 | F1 | — | — | NONE | NONE | 0.5 | INTERMEDIATE LAYER | 1.902 | 1.22 | 0.91 | LASER |
| COMPARATIVE EXAMPLE | h2 | F2 | — | — | NONE | NONE | 0.3 | INTERMEDIATE LAYER | 1.912 | 1.19 | 0.92 | LASER |
| COMPARATIVE EXAMPLE | h3 | F3 | — | — | NONE | NONE | 0.7 | INTERMEDIATE LAYER | 1.953 | 1.12 | 0.78 | ELECTRON BEAM |
| COMPARATIVE EXAMPLE | h4 | F4 | — | — | NONE | NONE | 0.8 | INTERMEDIATE LAYER | 1.961 | 1.09 | 0.81 | ELECTRON BEAM |
| COMPARATIVE EXAMPLE | h5 | F5 | $2 \times 10^8$ | 0.5 | EXIST-ENCE | EXIST-ENCE | 12 | INTERMEDIATE LAYER | 1.951 | 1.11 | 0.82 | ELECTRON BEAM |
| COMPARATIVE EXAMPLE | h6 | F7 | $2 \times 10^9$ | 0.2 | EXIST-ENCE | EXIST-ENCE | 11 | INTERMEDIATE LAYER | 1.954 | 1.19 | 0.81 | TOOTHED GEAR |

In H1 to H10, the grain oriented electrical steel sheets with excellent magnetic characteristics were obtained. On the other hand, in h1 to h6 in which any production condition was out of the range described above, the magnetic characteristics were insufficient.

INDUSTRIAL APPLICABILITY

According to the above aspects of the present invention, it is possible to industrially and stably provide the grain oriented electrical steel sheet in which the hysteresis loss and the iron loss are reduced by appropriately controlling the precipitation morphology of B compound, in the grain oriented electrical steel sheet (final product) which utilizes B as the inhibitor and which has high magnetic flux density. Accordingly, the present invention has the applicability for the industrial field of the grain oriented electrical steel sheet.

What is claimed is:

1. A grain oriented electrical steel sheet comprising:

a base steel sheet;

a lower layer which is arranged in contact with the base steel sheet; and an insulation coating which is arranged in contact with the lower layer and which includes a phosphate and a colloidal silica as main components, wherein the base steel sheet includes: as a chemical composition, by mass %, 0.085% or less of C;

0.80 to 7.00% of Si;

0.05 to 1.00% of Mn;

0.010 to 0.065% of Al;

0.0040% or less of N;

0.015% or less of Seq=S+0.406·Se;

0.0005 to 0.0080% of B; and a balance consisting of Fe and impurities, the base steel sheet includes a B compound whose major axis length is 1 to 20 μm and whose number density is $1\times10$ to $1\times10^6$ pieces/$mm^3$, and the lower layer is a glass film which includes a forsterite as main component or an intermediate layer includes a silicon oxide as main component.

2. The grain oriented electrical steel sheet according to claim 1, wherein the lower layer is the glass film, and when a glow discharge emission spectroscopy is conducted after removing the insulation coating and the glass film, when a region which is a glass film side from a thickness center of the base steel sheet is divided into two regions which are a surface region in the glass film side and a center region between the surface region and the thickness center, when a sputtering time to reach the center region is referred to as t (center), when a sputtering time to reach the surface region is referred to as t (surface), when a B emission intensity in the t (center) is referred to as $I_{B\_t\ (center)}$, and when a B emission intensity in the t (surface) is referred to as $I_{B\_t\ (surface)}$, the $I_{B\_t\ (center)}$ and the $I_{B\_t\ (center)}$ satisfy a following expression (1), $$I_{B\_t(center)} > I_{B\_t(surface)} \quad (1)$$

3. The grain oriented electrical steel sheet according to claim 1, wherein the lower layer is the intermediate layer, and when a total thickness of the base steel sheet and the intermediate layer is referred to as d, when a B emission intensity at a depth of d/2 from a surface of the intermediate layer in a case where a B emission intensity is measured by a glow discharge emission spectroscopy from the surface of the intermediate layer is referred to as $I_{B\ (d/2)}$, and when a B emission intensity at a depth of d/10 from the surface of the intermediate layer is referred to as $I_{B\ (d/10)}$, the $I_{B\ (d/2)}$ and the $I_{B\ (d/10)}$ satisfy a following expression (2), $$I_{B(d/2)} > I_{B(d/10)} \quad (2).$$

4. The grain oriented electrical steel sheet according to claim 1, wherein the B compound is at least one selected from group consisting of $Fe_2B$ and $Fe_3B$.

5. The grain oriented electrical steel sheet according to claim 2, wherein the B compound is at least one selected from group consisting of $Fe_2B$ and $Fe_3B$.

6. The grain oriented electrical steel sheet according to claim 3, wherein the B compound is at least one selected from group consisting of $Fe_2B$ and $Fe_3B$.

7. A grain oriented electrical steel sheet comprising:

a base steel sheet;

a lower layer which is arranged in contact with the base steel sheet; and an insulation coating which is arranged in contact with the lower layer and which includes a phosphate and a colloidal silica as main components, wherein the base steel sheet includes: as a chemical composition, by mass %, 0.085% or less of C;

0.80 to 7.00% of Si;

0.05 to 1.00% of Mn;

0.010 to 0.065% of Al;

0.0040% or less of N;

0.015% or less of Seq=S+0.406·Se;

0.0005 to 0.0080% of B; and a balance comprising Fe and impurities, the base steel sheet includes a B compound whose major axis length is 1 to 20 μm and whose number density is $1\times10$ to $1\times10^6$ pieces/$mm^3$, and the lower layer is a glass film which includes a forsterite as main component or an intermediate layer includes a silicon oxide as main component.

* * * * *